United States Patent [19]
Carlson et al.

[11] Patent Number: 5,623,592
[45] Date of Patent: Apr. 22, 1997

[54] METHOD AND APPARATUS FOR CONSTRUCTING AN ICONIC SEQUENCE TO OPERATE EXTERNAL DEVICES

[75] Inventors: Jeffrey D. Carlson, Sunnyvale; Jorge M. Fernandes, Newark, both of Calif.

[73] Assignee: Molecular Dynamics, Sunnyvale, Calif.

[21] Appl. No.: 325,043

[22] Filed: Oct. 18, 1994

[51] Int. Cl.⁶ .................................................. G06F 3/00
[52] U.S. Cl. .......................... 395/348; 395/672; 364/188
[58] Field of Search .................. 395/155–161, 395/500, 800, 700; 364/188–190, 474.22–474.28, 481–487, 492–495, 500, 506–511, 525–526, 550, 283.3, 286, 275.5, 267.91, 267.9, 267.5, 927.631, 927.64; 356/72–73

[56] References Cited

U.S. PATENT DOCUMENTS

| | | | |
|---|---|---|---|
| 4,901,221 | 2/1990 | Kodosky et al. | 395/159 |
| 4,914,568 | 4/1990 | Kodosky et al. | 395/159 |
| 5,168,441 | 12/1992 | Onarheim et al. | 364/188 X |
| 5,291,587 | 3/1994 | Kodosky et al. | 395/500 |
| 5,301,301 | 4/1994 | Kodosky et al. | 395/500 |
| 5,301,336 | 4/1994 | Kodosky et al. | 395/800 |
| 5,343,401 | 8/1994 | Goldberg et al. | 364/188 X |
| 5,371,895 | 12/1994 | Bristol | 395/800 |
| 5,388,264 | 2/1995 | Tobias, II et al. | 395/159 X |
| 5,394,522 | 2/1995 | Sanchez-Frank et al. | 395/159 |
| 5,436,718 | 7/1995 | Fernandes et al. | 356/73 |
| 5,443,791 | 8/1995 | Cathcart et al. | 364/188 X |
| 5,475,851 | 12/1995 | Kodosky et al. | 395/800 |
| 5,481,741 | 1/1996 | McKaskle et al. | 395/800 |

OTHER PUBLICATIONS

Baker et al, "A Flexible Instrumentation and Control System Applied to a Power and Machines Laboratory", IEEE, Aug. 1994, pp. 1137–1144.

Skelly et al, "A LabView Approach to Instrumentation for the TFTR Bumper Limiter Alignment Project", IEEE, 1992, pp. 765–768.

HiraKawa et al, "A Framework for Construction of Icon Systems", IEEE, 1988, pp. 70–77.

Edel, "The Tinkertoy Graphical Programming Environment", IEEE, 1988, pp. 1110–1115.

Chang, "Visual Languages: A Tutorial and Survey", IEEE Software, Jan. 1987, pp. 29–39.

Ichikawa et al, "Visual Programming–Toward Realization of User–Friendly Programming Environments", 1987 FJCC, pp. 129–137.

Vose et al, "LabView: Laboratory Virtual Instrument Engineering Workbench", Byte, Sep. 1986, pp. 84–92.

National Instruments, *LabView for Windows*, Nov. 1992 Edition, pp. 1–1 to 10–7.

Optikwerk, Inc., Titled "Anatomy of an Easy to use Optics CAD/CAE system", Optikwerk, Inc., Jan. 1994.

*Primary Examiner*—Mark R. Powell
*Assistant Examiner*—John E. Breene
*Attorney, Agent, or Firm*—Blakely, Sokoloff, Taylor & Zafman

[57] ABSTRACT

A method and apparatus for causing a computer to drive one or more external devices is provided. A computer executes instructions which cause the computer to display an experiment design region and a set of icons. A user copies the icons into the experiment design region to specify the various phases of an experiment. By setting controls in windows associated with the icons, a user specifies how the general stages of an experiment will be performed. Specifically, a user operates controls associated with the icons in the experiment design region to specify which devices will be used in the experiment, how data generated during the experiment will be stored, how different sets of data are related, calculations to be performed on the data, and the format of reports generated based on the data gathered during the experiment. The user specifies the operations to be performed by constructing an icon sequence in a scheduler window. The icon sequence may include device icons which represent devices, operation icons which represent the operations to be performed, and sequence control icons which affect the sequencing of certain designated operations. The computer then issues control signals to the devices specified in the icon sequence to cause the devices to perform the operations specified in the icon sequence. The operations are performed in the order specified by the icon sequence.

24 Claims, 32 Drawing Sheets

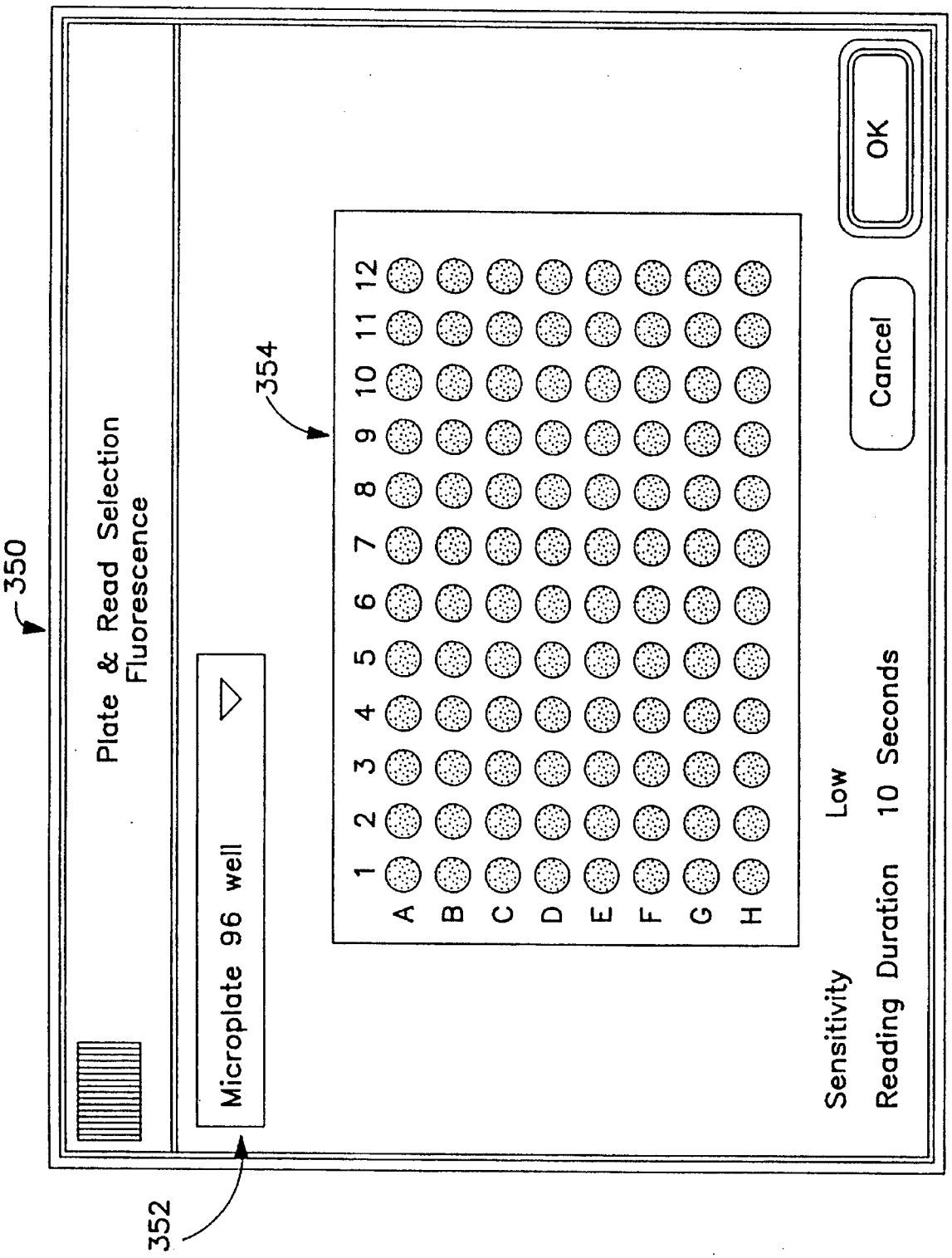

FIG. 5

METHOD AND APPARATUS FOR CONSTRUCTING AN ICONIC SEQUENCE TO OPERATE EXTERNAL DEVICES

FIELD OF THE INVENTION

The present invention relates to a method and apparatus for programming a computer and, more specifically, to a method for programming a computer to operate an external device according to a schedule.

BACKGROUND OF THE INVENTION

Various methods have been developed for programming a computer. One common method involves writing source code which designates a series of operations. The source code is then compiled into machine-executable code. The computer then loads and executes the machine-executable code to perform the designated series of operations. The source code programming method has a significant disadvantage in that it generally requires a high degree of programming skill and many hours of software design, coding, testing and debugging. Thus, this method is impractical for the average computer user.

Another method for programming a computer involves writing a script file which designates a series of operations. According to this method, the script file is interpreted by a script execution routine. In response to reading the script file, the script execution routine causes the computer to perform the operations designated in the script file. The script programming method is similar to the source programming code method with the exception that script languages are usually tailored to particular applications. For example, a communications program may be designed to execute script files with commands for setting protocols, setting the operational parameters of a modem, and logging on to remote systems.

Because they only cover a specific application, a script language typically has fewer commands than standard programming languages. Because fewer and more specialized commands are available to the user, less skill and time are required to create script files than are required to create source code files. However, the creation of meaningful script files is still beyond the skill level of many computer users.

Further, for complex tasks such as automating an experiment, a limited command set may not suffice. For example, a single experiment may involve operations on numerous instruments. Each of the instruments may be capable of operating in a variety of modes. Each mode may support numerous types of operations. In addition, each operation may be performed on numerous combinations of specimens. A script language designed to support more than a trivial amount of instrument/mode/operation/specimen combinations would likely be as complex as a source code language, and therefore require a programming expertise not normally possessed by technicians who perform experiments.

A disadvantage common to both source code and script programming is that they are based on textual commands. Because the commands are textual, the commands tend to favor a particular natural language. For example, a programming language which contains the commands "begin" and "end" would be better understood by English-speaking users, and less comprehensible to users that do not speak English.

A second disadvantage common to both source code and script programming is that typical textual programming environments do not inherently assist the programmer. For example, most textual programming environments present the programmer with a blank screen or window in which to type the text of a program or script. The blank window does not communicate the available commands. Therefore, a programmer must either have the commands memorized, or frequently revert to a help screen or a user's manual.

A third disadvantage common to both source code and script programming is that they are both textual. As textual descriptions, source code and scripts are subject to numerous types of errors. For example, textual descriptions ,are subject to lexical errors, syntactic errors, and logic errors. Because textual descriptions are subject to numerous types of errors, the process of designing and debugging error-free programs is arduous and time-intensive.

A fourth disadvantage is that source code and script programming require many lines of code to accomplish a single assignment or command. Therefore, the programmer must retype lines of text or use text editors to move text from one source to another. For example, the user will have to configure the external device before initiating an execution command. All or parts of the configuration will change depending on the demands of the technician who performs the experiment. A technician often shortens complex configurations to a simple word or phrase which is used in conversation and in documentation to represent the complex configuration or settings. Source code and script programming do not use shortened technician language as an alternative to the many lines of code.

In light of the foregoing, it is clearly desirable to provide a method for automating experiments which does not require a high degree of programming expertise. Further, it is clearly desirable to provide a method for programming which contains a high degree of natural language independence. In addition, it is desirable to provide a method for programming a computer which supports a relatively extensive number of operations, but which presents the user with a relatively small subset of relevant operations at any given time. Further, it is desirable to provide a method for programming which is not subject to all of the types of errors inherent in textual programming.

SUMMARY OF THE INVENTION

According to one embodiment of the invention, a system for automatically performing a series of operations is provided. The system generally includes a computer and at least one external device. The computer has a display device and an input device. The external device is operatively coupled to the computer. The computer executes a series of instructions to cause the at least one external device to perform the series of operations.

The instructions include instructions for constructing and displaying a sequence of icons on the display device responsive to input from the input device. The sequence of icons includes at least one operation icon. The operation icon specifies the series of operations. The instructions also include instructions for generating control signals to the external device. The control signals cause the external device to perform the series of operations.

The series of instructions may also include instructions for inserting into the sequence of icons a plurality of operation icons responsive to input from the input device. Each operation icon specifies an operation. The instructions may also include instructions which cause the computer to generate control signals to cause the series of operations to be performed in a sequence corresponding to the relative positions of the operation icons in the sequence of icons.

According to another embodiment of the invention, a method is provided for causing a computer, which has a display device, to operate an external device. According to the method, the computer is caused to display on the display device a device icon. The device icon represents the external device. The computer is caused to display on the display device an operation icon. The operation icon represents an operation performable by the external device. An icon sequence is constructed. The icon sequence includes the device icon and the operation icon. The computer is caused to generate control signals responsive to the icon sequence. The control signals include a control signal which causes the external device to perform the operation.

According to an aspect of the invention, the device icon is caused to represent the external device by specifying a specific device type for the device icon. The specific device type is the device type of the external device. The computer is caused to display on the display device a plurality of indications of external devices of the specific device type. The indications include an indication of the external device. The indication of the external device is selected from the indications.

According to another aspect of the invention, the external device is a first external device of a plurality of external devices and the device icon is a first device icon of a plurality of device icons. Each device icon of the device icons represents a corresponding external device of the external devices. The step of constructing the icon sequence includes inserting the device icons into the icon sequence.

According to another aspect of the invention, constructing the icon sequence involves inserting a plurality of operation icons into the icon sequence. The operation icons represent a plurality of operations. The computer is caused to generate control signals to cause the operations to be performed by the external devices. The particular device of the external devices which performs a given operation of the operations is determined based upon the relative positions of the device icons and the operation icons in the icon sequence.

According to another aspect of the invention, the computer is caused to display on the display device a sequence control icon. The step of constructing the icon sequence involves inserting the sequence control icon into the icon sequence. The computer is caused to generate control signals in a sequence responsive to the sequence control icon. A plurality of target icons in the icon sequence are specified. The target icons include at least one operation icon. A number of repetitions associated with the sequence control icon is specified. The computer is caused to generate control signals to cause an external device associated with the operation icon to perform the operation represented by the operation icon for the specified number of repetitions.

According to yet another aspect of the invention, the computer is caused to display on the display device an experiment design region. The computer is caused to display on the display device a scheduler icon. The device icon is copied into the experiment design region. A scheduler icon is copied into the experiment design region. The device icon is associated with the scheduler icon. The computer is caused to display on the display device a scheduler window associated with the scheduler icon. The icon sequence is constructed in the scheduler window.

The computer is caused to display on the display device an association indication that visually depicts an association between device icon and the scheduler icon. The computer is caused to display on the display device a database icon. The database icon is copied into the experiment design region. A database format associated with the database icon is specified. The scheduler icon is associated with the database icon. The data generated during the operation is stored in the specified database format.

The computer displays on the display device a report icon. The report icon is copied into the experiment design region. A particular report format associated with the report icon is specified. The database icon is associated with the report icon. A report of the data is generated in the particular report format.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3c illustrates the window that appears when a sample selection icon within the window illustrated in FIG. 3a is invoked;

FIG. 5 illustrates the window that appears when a data correlation icon in an experiment window is invoked according to an embodiment of the invention;

FIG. 9l illustrates a stacker dialog box displayed when a stacker icon on a time line is selected according to an embodiment of the invention;

DETAILED DESCRIPTION OF THE PREFERRED EMBODIMENT

Figure 1:
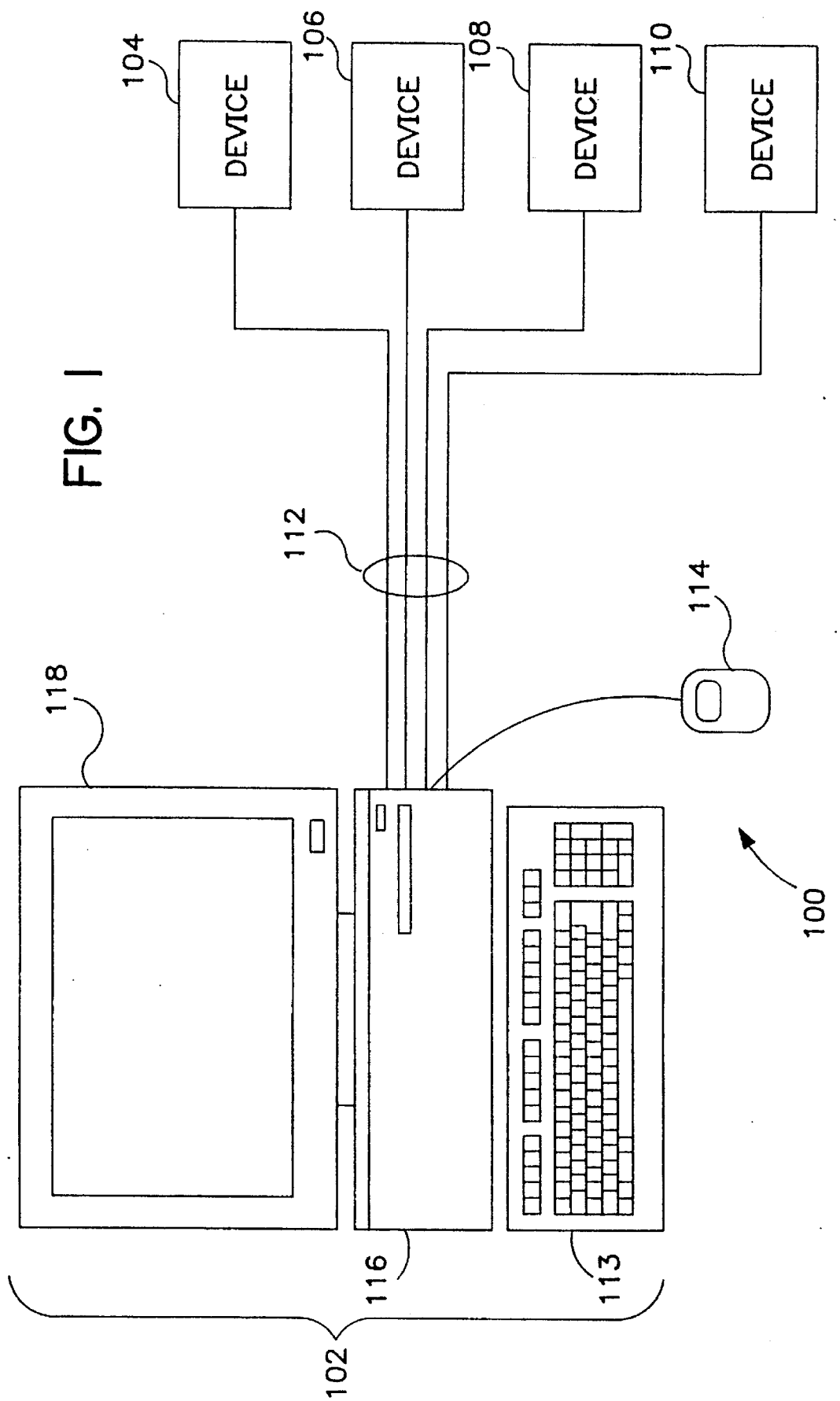
FIG. 1 illustrates a system for performing automated experiments according to an embodiment of the invention.

Referring to FIG. 1, it illustrates a system 100 for performing automated experiments. System 100 includes a computer 102 and a plurality of external devices 104, 106, 108 and 110. Computer 102 generally includes a keyboard 113, a mouse 114, a CPU 116 and a display device 118. Computer 102 is connected to external devices 104, 106, 108 and 110 by a plurality of lines 112. While specific input mechanisms, such as keyboard 113 and mouse 114 are illustrated for the purposes of explanation, the invention is not limited to any specific type of input device. For example, computer 102 may alternatively or additionally include a touch-sensitive screen or a speech recognition unit.

Devices 104, 106, 108 and 110 represent devices necessary to perform a particular experiment. An experiment may involve operations from a variety of types of devices. For example, an experiment may involve a first device which affects a specimen, a second device which conveys the specimen from the first device to a third device, and the third device which senses and generates data based on the specimen. Many devices can perform more than one type of operation. For example, a photometer can both shake a specimen and measure the luminescence of a specimen.

Computer 102 controls the operation of devices 104, 106, 108 and 110 through control signals generated over lines 112. Computer 102 may be programmed to activate devices 104, 106, 108 and 110 to perform a particular experiment automatically. However, as explained above, a typical source code or script programming process requires a high degree of skill and extensive design, development and debugging time.

In the presently preferred embodiment of the invention, a computer may be programmed to automate an experiment by simply arranging a sequence of icons displayed on display device 118. The term icon, as used herein, refers to any type of visual indicator displayed on a display device. While graphic icons are used herein to describe the present invention, the invention may also be implemented with other types of icons, such a textual indicators. The iconic programming process shall now be described in greater detail.

THE EXPERIMENT DESIGN WINDOW

Figure 2:
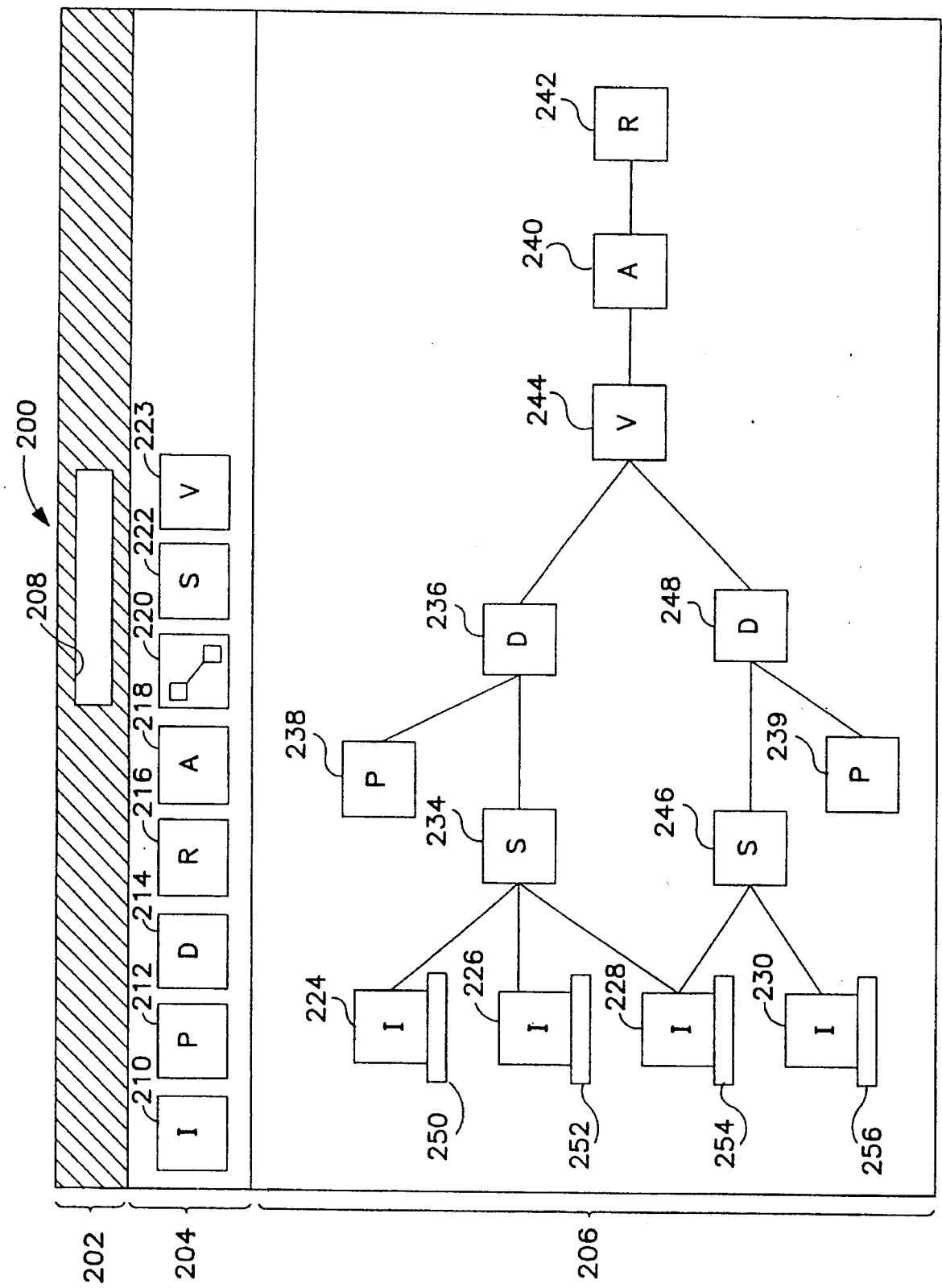
FIG. 2 illustrates an experiment design window for organizing an experiment according to one embodiment of the invention.

Referring now to FIG. 2, it illustrates an experiment design window 200 according to one embodiment of the invention. Experiment design window 200 is displayed on display device 118 responsive to the execution of instructions by CPU 116. Experiment design window 200 generally includes a title bar 202, an icon bar 204, and an experiment design region 206. Title bar 202 includes a title region 208 which preferably contains a label identifying the particular experiment illustrated in experiment design region 206. The label or title displayed in the title region 208 is preferably set by the user.

Icon bar 204 includes a plurality of icons, including a device icon 210, a data correlation icon 212, a database icon 214, a report icon 216, an analysis icon 218, an association icon 220, a scheduler icon 222, and a data view icon 223. Experiment design region 206 initially contains nothing. A user designs an experiment by copying or moving icons from the icon bar 204 into the experiment design region 206 and associating the icons in the experiment design region 206 with each other to reflect the desired experimental flow, as shall now be described.

DEVICE ICONS

Device icon 210 generally represents "external devices". External devices are devices other than the computer 102 which may be operated by control signals sent by the computer 102. For the purposes of explanation, the present invention is described herein in the context of automating an experiment. However, the present invention is not limited to experiment automation. Therefore, external devices may include, for example, a file server on a network to which computer 102 is connected, another computer, or a printer. Initially, device icon 210 does not represent any specific external device, but simply represents the category of "external devices".

To begin the experiment automation process, a user moves or makes a copy of the device icon 210 placing it into the experiment design region 206 for each external instrument setup that will be required for the experiment. In the preferred embodiment, icons are moved by the click-and-drag process employed by Microsoft Windows™ and commonly known in the art which cause them to appear in the experiment design region 206.

For the purposes of explanation, it will be assumed that the experiment to be programmed requires the operation of each of devices 104, 106, 108 and 110. Further, it will be assumed that during the experiment, the operational parameters for each device will be not be altered. Based on these assumptions, the experiment will involve four instrument setups. Therefore, a user clicks on device icon 210 and drags a copy of the device icon 210 into experiment design region 206 four times. The four copies are illustrated as device icons 224, 226, 228 and 230. If the settings of an instrument must be changed during an experiment, then a separate device icon is created for each setting configuration in which the instrument will be used.

Once a copy of a device icon for each instrument setup involved in the experiment has been dragged to experiment design region 206, the specific instrument setup for each device icon in the experiment design region 206 must be established. To perform this association for a given device icon, a user invokes a window associated with the device icon. In the preferred embodiment, the window associated with a given icon is invoked by double-clicking on the given icon. For example, to invoke the window associated with device icon 224, a user clicks twice on device icon 224 in rapid succession.

Figure 3A:
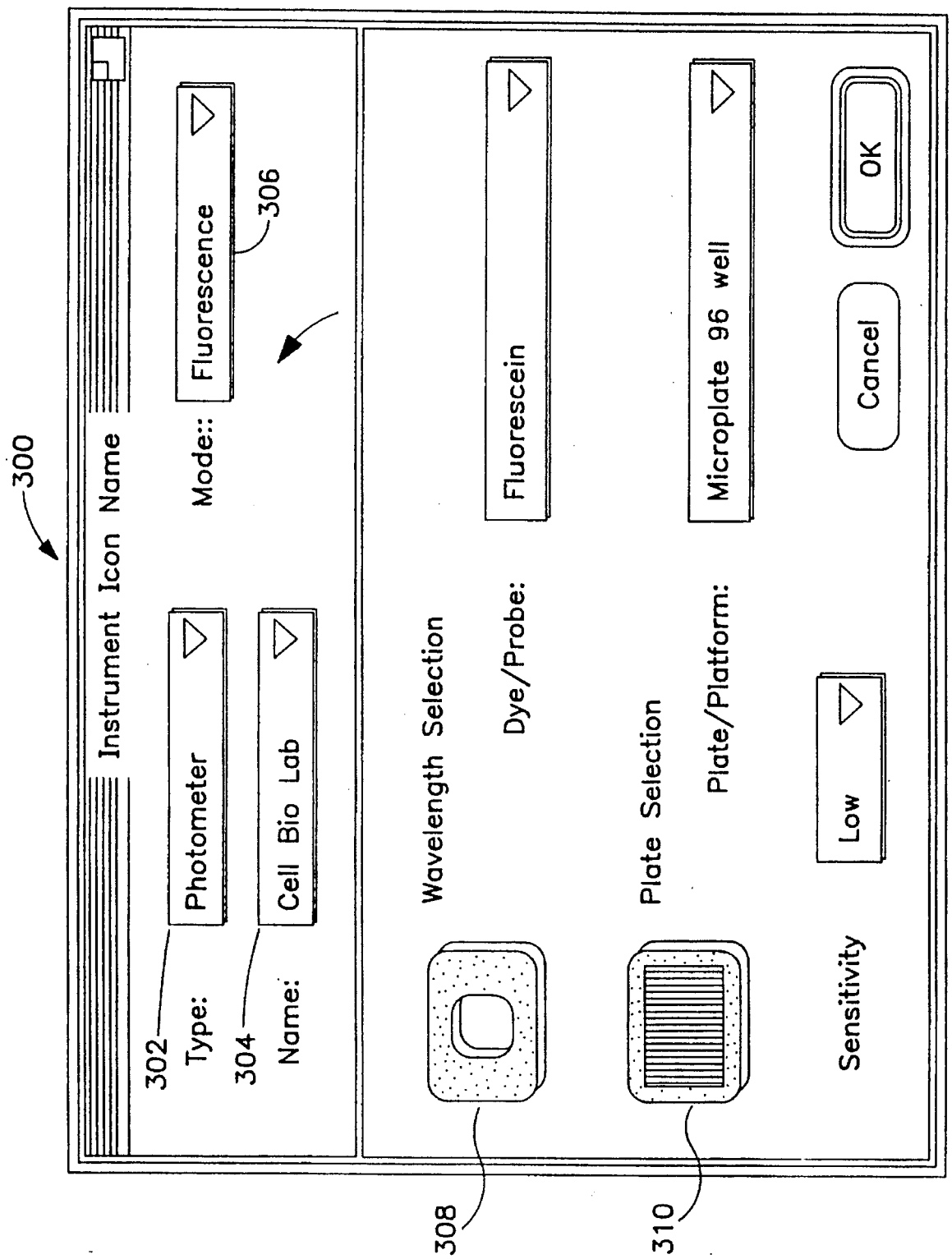
FIG. 3a illustrates the window that appears when a device icon in an experiment design window is invoked according to an embodiment of the invention.

FIG. 3a illustrates an embodiment of a window 300 that may appear when a device icon is invoked. The window 300 associated with a device icon preferably includes a plurality of controls which allow a user to specify settings for an instrument. Preferably, through operation of controls 302, a user first selects the general category of the instrument with which the device icon will be associated. For example, a user may select "photometer" from a list including "photometer", "modem", "laser", etc. Once the general category of instrument has been selected, the window displays a list of specific instruments of the selected instrument type. From this list, a user then selects a specific instrument by operation of controls 304. For example, assuming that both device 104 and device 108 are photometers, the user may select device 104 from a list which contains both device 104 and device 108.

Once a specific instrument has been selected, the window displays a set of controls for setting the operation parameters of the selected device. For example, a photometer may operate in either a fluorescence mode or an absorbence mode. Therefore, when the selected instrument type is a photometer, controls 306 are displayed in the window to allow a user to designate a specific operational mode for the selected instrument.

Figure 3B:
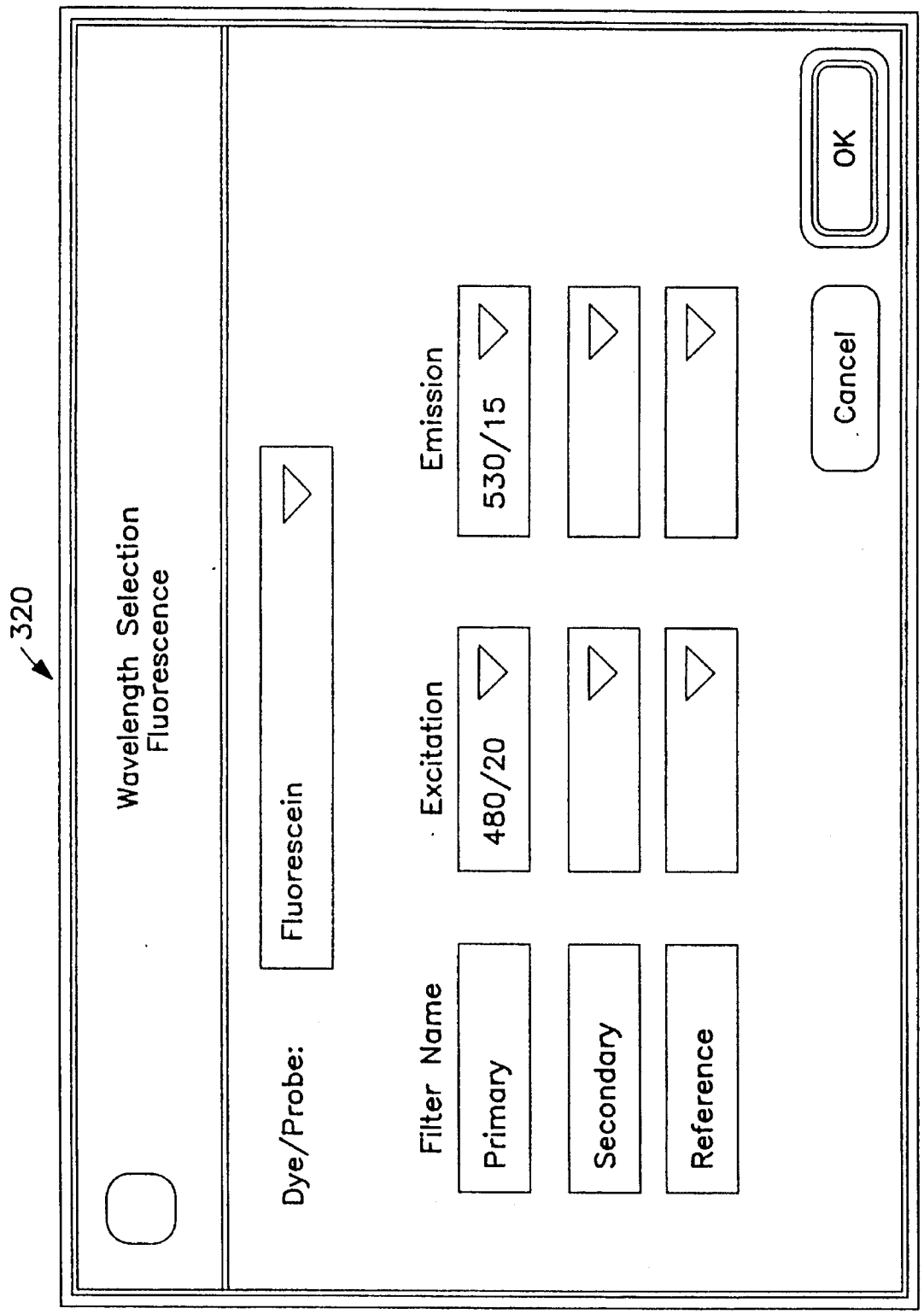
FIG. 3b illustrates the window that appears when a wavelength selection icon within the window illustrated in FIG. 3a is invoked.

Certain instruments, such as photometers, acquire data during operation. For these types of instruments, the window 300 may also display controls 308 and 310 which allow a user to designate parameters for the data acquisition process. For example, control 308 in the window 300 may allow a user to select between different wave length filters for the designated photometer. FIG. 3b illustrates a window 320 that appears when control 308 illustrated in FIG. 3a is selected. Window 320 includes controls that allow a user to specify the attributes of primary, secondary and reference filters.

Certain instruments, such as photometers, may be able to gather data from a plurality of specimens in a single data acquisition operation. Therefore, controls 310 are provided which allow a user to designate from which specimens data will be gathered. FIG. 3c illustrates a window 350 that appears when control 310 illustrated in FIG. 3a is invokes. Window 350 includes a control 352 for selecting a particular plate, and a control 354 for selecting particular specimen locations within the selected plate. The selected instrument together with the selected operational parameters constitute an instrument setup.

FIGS. 3a, 3b and 3c illustrate how windows and controls are layered so that, at any given moment, the user is presented with only of the level of detail he requires. For example, if standard wavelength settings and specimen locations have already been defined, then the standard settings may be selected directly from window 300 without invoking the greater detail of windows 320 and 350. On the other hand, if standard setting have not yet been defined, or if an experiment must deviate from the standard settings, then the more detailed level of control is easily available by invoking windows 320 and/or 350 from window 300.

By selecting user-defined names from menus to designate instrument type, name, mode, wavelength settings, platforms and sensitivity, a user can save time and prevent entry errors. These benefits result from the fact that the user does not have to select each specific setup parameter for every experiment once standard user-defined settings have been established. More detailed controls are available by operating controls in a first window that open additional windows (e.g. FIGS. 3b and 3c) that display more detail than the first window. The user can customize specific parameters if needed, but the order of detail entry is found if the user progresses into the next window.

The device icon window 300 may also contain controls which allow a user to enter a label to identify the specified instrument setup. This label is displayed below the device icon. For example, if device 104 is selected in the window associated with device icon 224, and fluorescence mode is selected for device 104, then a user may enter "Device 104-Fluorescence" for label 250.

Preferably, the controls in windows associated with an icon include as little text as possible. For example, controls for selecting an instrument type may include a plurality of icons depicting various types of instruments. An instrument type may then be selected by clicking on the icon which depicts the instrument of the desired type. The controls in an icon's window may also include controls which invoke child windows.

A user associates each of device icons 224, 226, 228 and 230 with an external device and configures the external device by the process described above. In the present example, it shall be assumed that a user associated device icons 224, 226, 228 and 230 with devices 104, 106, 108 and 110 respectively. Therefore, labels 250, 252, 254 and 256 will indicate devices 104, 106, 108 and 110 respectively.

SCHEDULER ICONS

Many experiments involve a single linear sequence of operations. However, for the purposes of explanation, it shall be assumed that the desired experiment requires the performance of two series of operations. The first series of operations requires devices 104, 106 and 108, while the second series of operations requires devices 108 and 110. For each sequence of operations, a user makes one copy of the scheduler icon 222 into experiment design region 206. Preferably, all of the icons on icon bar 204 may be copied into experiment design region 206 by the same click-and-drag method describe above with respect to the device icon 210. Since the desired experiment involves two separate series of operations, a user copies two scheduler icons 234 and 246 into experiment design region 206.

Once scheduler icons 234 and 246 have been copied into experiment design region 206, a user must designate which instruments will be needed in each series of operations. This designation is made by selecting the association icon 220, and then selecting the device icon and the scheduler icon to be associated. For example, device 104, which has been associated with device icon 224, is required in the first sequence of operations. Therefore, a user selects association icon 220, device icon 224 and scheduler icon 234 to indicate that device 104 will be used in the series of operations associated with scheduler icon 234. By the same method, a user associates device icons 226 and 228 with scheduler icon 234, and device icons 228 and 230 with scheduler icon 246. Preferably, these associations are visually depicted. In the presently preferred embodiment, associations between icons are depicted by lines connecting the associated icons.

As has been explained, scheduler icon 234 represents a first series of operations, and scheduler icon 246 represents a second series of operations. For the purposes of explanation, it shall be assumed that data will be generated during both the first series of operations and the second series of operations. It will also be assumed that at least some of the data generated during the first series of operations is related to at least some of the data generated during the second series of operations.

DATABASE ICONS

When data is generated, it must be stored somewhere or it will be lost. To designate the storage location for data generated during a series of operations, a user copies the database icon 214 onto the experiment design region 206. The user then associates the scheduler icon that represents the series of operations in which data will be generated with the database icon. In the present example, data will be generated during both the first and the second series of operations. Therefore, a user copies two database icons 236 and 248 into experiment design window 206 and associates the database icons with scheduler icons 234 and 246, respectively. Preferably the operations of copying and associating icons is performed as described above.

Figure 4:
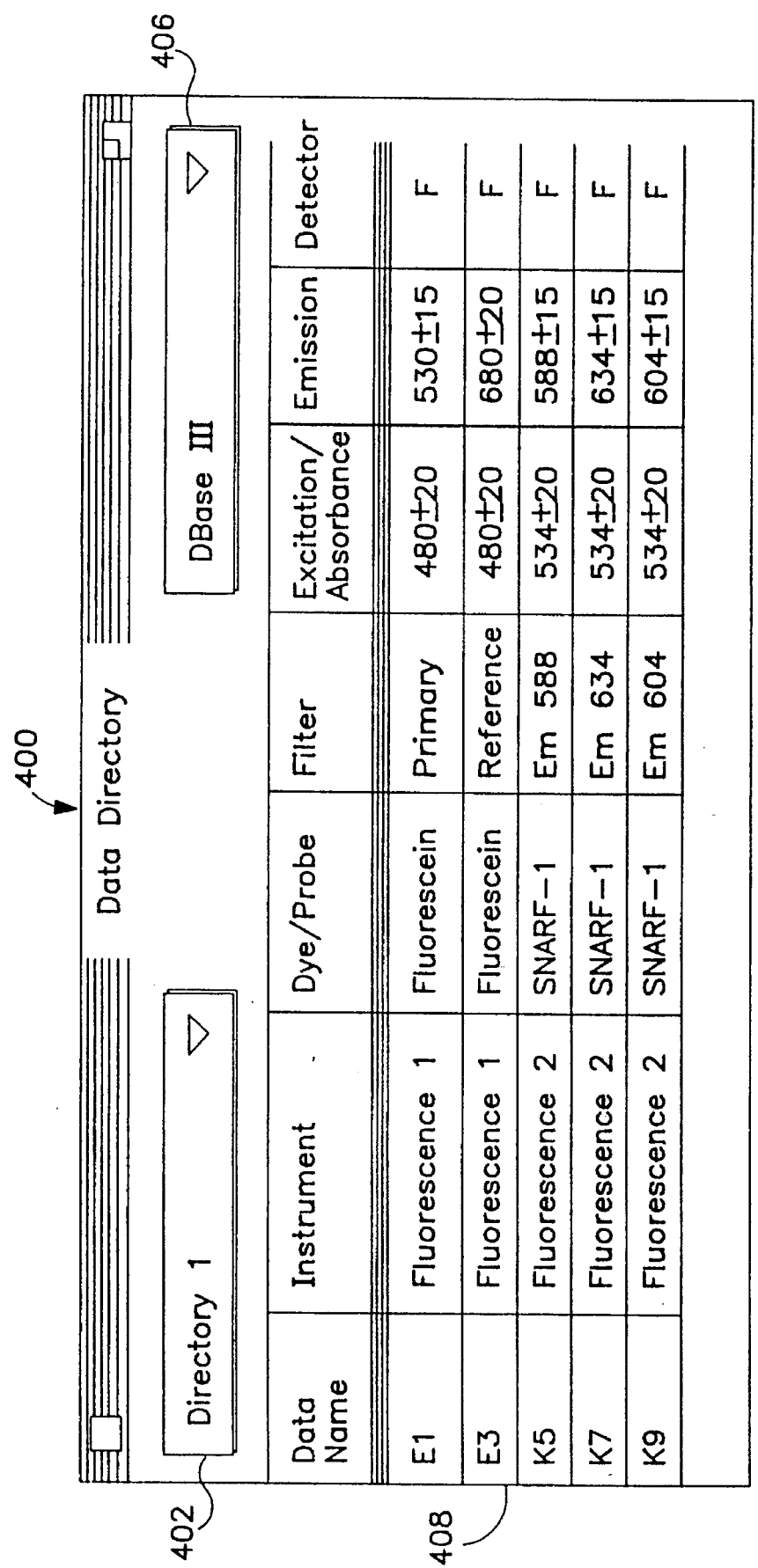
FIG. 4 illustrates the window that appears when a database icon in an experiment window is invoked according to an embodiment of the invention.

To designate a specific data storage location and data format, the user then invokes the window associated with a given database icon. Preferably the window associated with a particular icon is invoked, as described above, by double-clicking on the icon. FIG. 4 illustrates a window 400 associated with a database icon according to one embodiment of the invention. The window 400 includes controls 402 for selecting a storage location and controls 406 for designating a storage format.

In the window 400, a storage location may be designated, for example, by selecting a particular computer, hard drive, and storage directory. The storage format may be designated by selecting a particular database standard, such as Paradox or dbase III. The data generated during the first series of operations will be stored in the location and format designated in the window associated with database icon 236, and the data generated during the second series of operations will be stored in the location and format designated in the window associated with database icon 248.

Preferably, once the data acquisition operations have been completed, then window 400 displays a table 408 containing information about the data that was acquired and stored. The information may include, for example, a name or label for each set of data, the instrument that acquired the data, and the operational parameters of the instrument during the data acquisition.

DATA CORRELATION ICONS

When data has been collected and stored, it exists as raw numeric values collected with a specific device 104, 106, 108, and 110 and from a specific sample. Some of the numeric values may be related or be of particular importance. For example, two values may represent measurements of the same sample. However, this relationship is not reflected in the raw data gathered during the experiment.

To establish this relationship, a user makes a copy of data correlation icon 212 in experiment design region 206. The copy of the data correlation icon 212 is then associated with the database icon(s) representing the related set(s) of data. In the present example, a data correlation icon 238 in experiment design region 206 is associated with database icon 236 and a data correlation icon 239 is associated with database icon 248.

To specify relationships between data, and what the specific relationships are, a user assigns each specimen a label. Specimens taken from the same sample are given identical labels. Specimens that have a particular significance are assigned labels that have a predefined meaning. The labels associated with specimens on a particular plate is referred to herein as plate definition.

A user establishes plate definitions by operating controls provided in a window associated with a data correlation icon. FIG. 2 shows the creation of a plate definition (established by a data correlation icon 238) associated with one set of data (represented by database icon 236) and a different plate definition (established by data correlation icon 239) associated with another set of data (represented by database icon 248).

Figure 5:
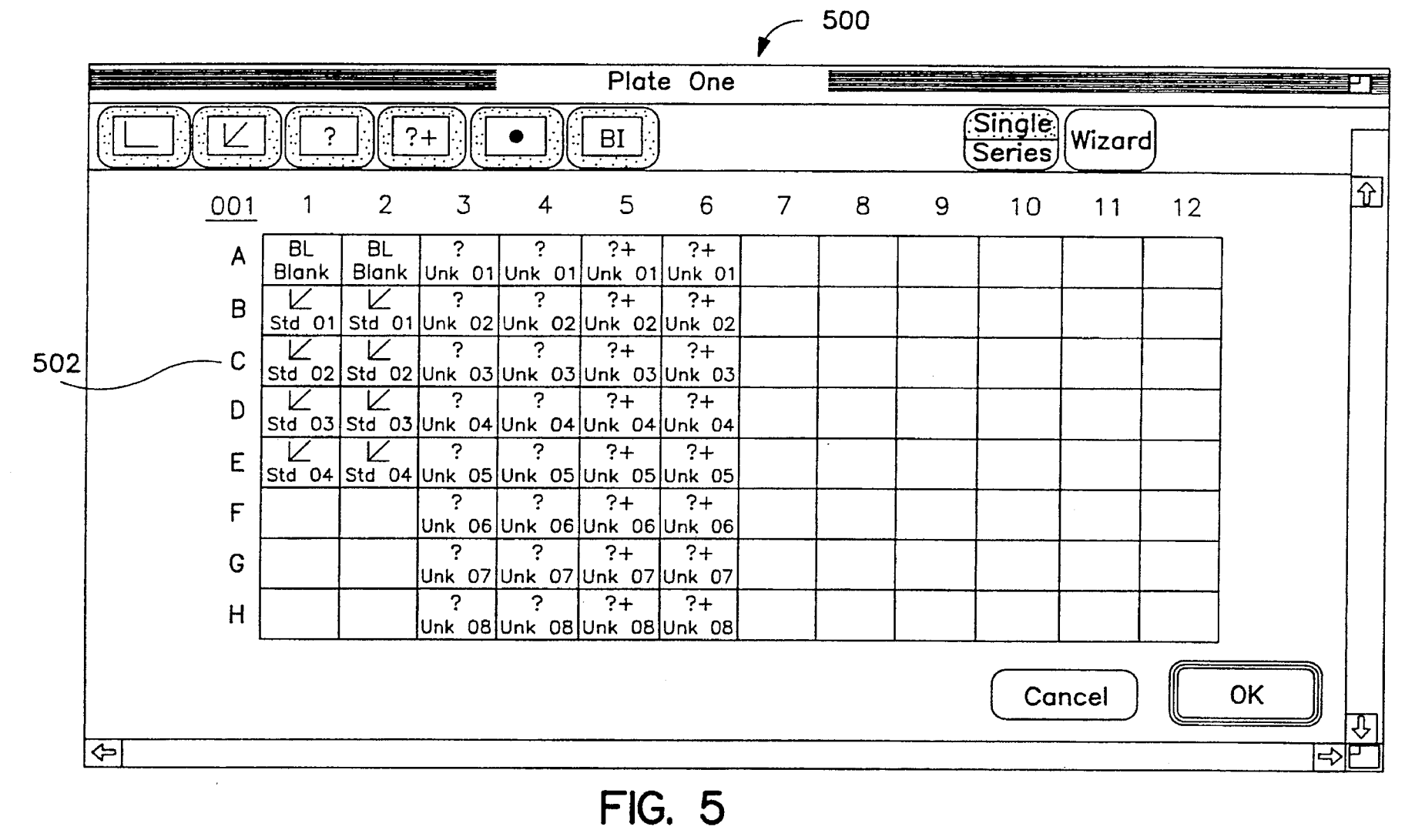

FIG. 5 illustrates a window 500 associated with a data correlation icon according to one embodiment of the invention. Window 500 includes a table 502 in which each cell corresponds to a specimen on a plate. A user assigns a label to a specimen by entering the label into the corresponding cell of table 502. For example, the specimen corresponding to cell E1 has been assigned the label "Std 04". The specimen corresponding to cell E2 has also been assigned the label "Std 04", indicating that the specimens corresponding to cells E1 and E2 are from the same sample.

As mentioned above, specimens that have a particular significance are assigned labels with a particular predefined meaning. For example, a user may indicate whether a specimen is "standard" or "unknown" by assigning to the specimens the labels "Std" and "Unk", respectively.

DATA VIEW ICONS

Often, raw data generated during an experiment is unintelligible until it is massaged in a particular manner. Values that are determined by performing calculations on the raw data gathered in an experiment are referred to herein as derived data. To calculate derived data and to display the raw and/or derived data, a user makes a copy of the data view icon 223 in the experiment design region 206. In the present example, a data view icon 244 has been copied into the experiment design region 206 and associated with database icons 236 and 248. Data view icon 244 may alternatively have been associated with only database icon 236 or only database icon 248.

Data view icon 244 may designate calculations to be performed on data represented by any database icons with which data view icon 244 is associated. Since data view icon 244 is associated with both database icons 236 and 248, data view icon 244 can designate calculations to be performed on the data generated in either or both of the series of operations. Further, file designated calculations can be specified using the labels established in the window of data correlation icons 238 and 239.

Figure 6A:
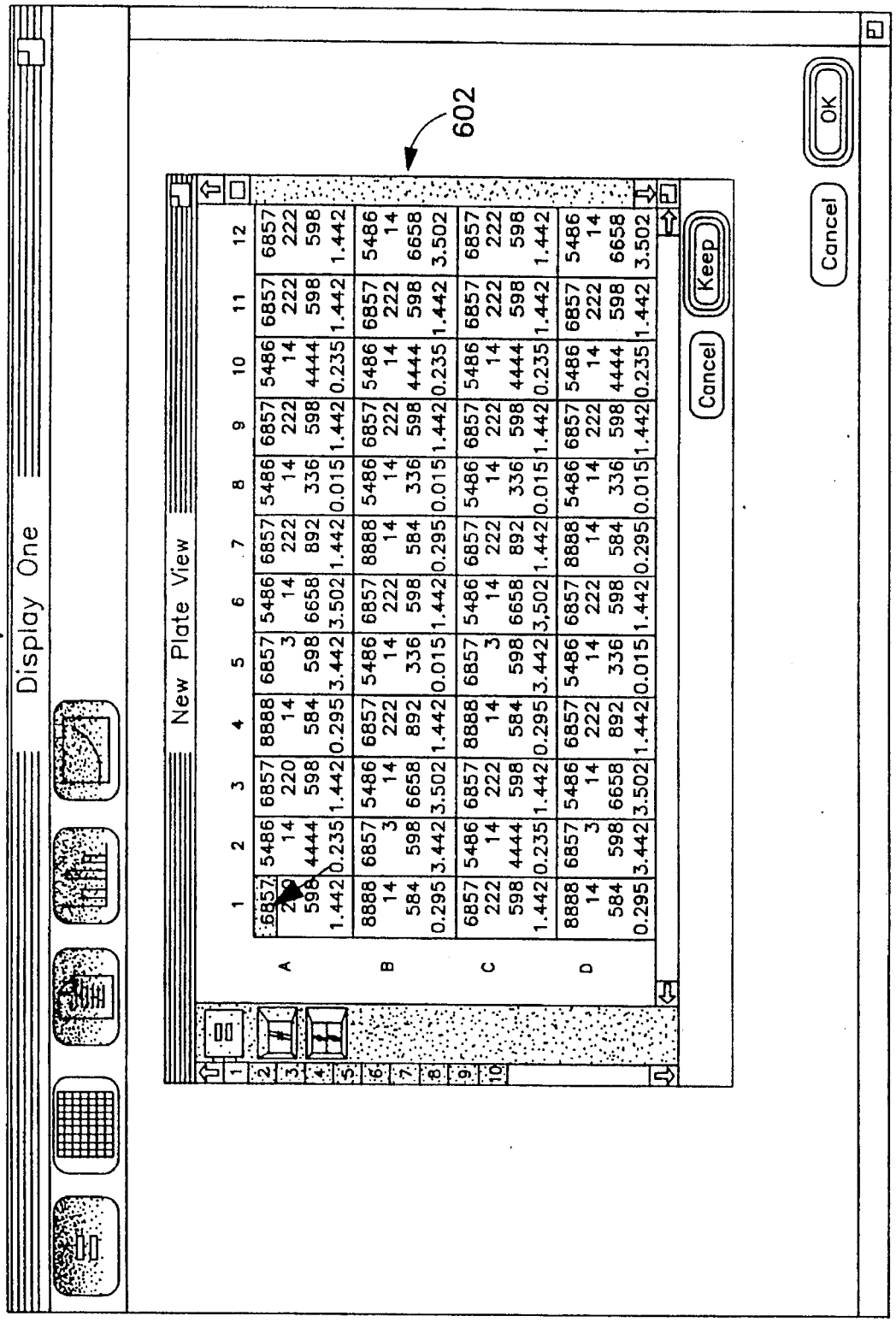
FIG. 6a illustrates a data table in the window that appears when the data view icon in an experiment window is invoked according to an embodiment of the invention.
Figure 6B:
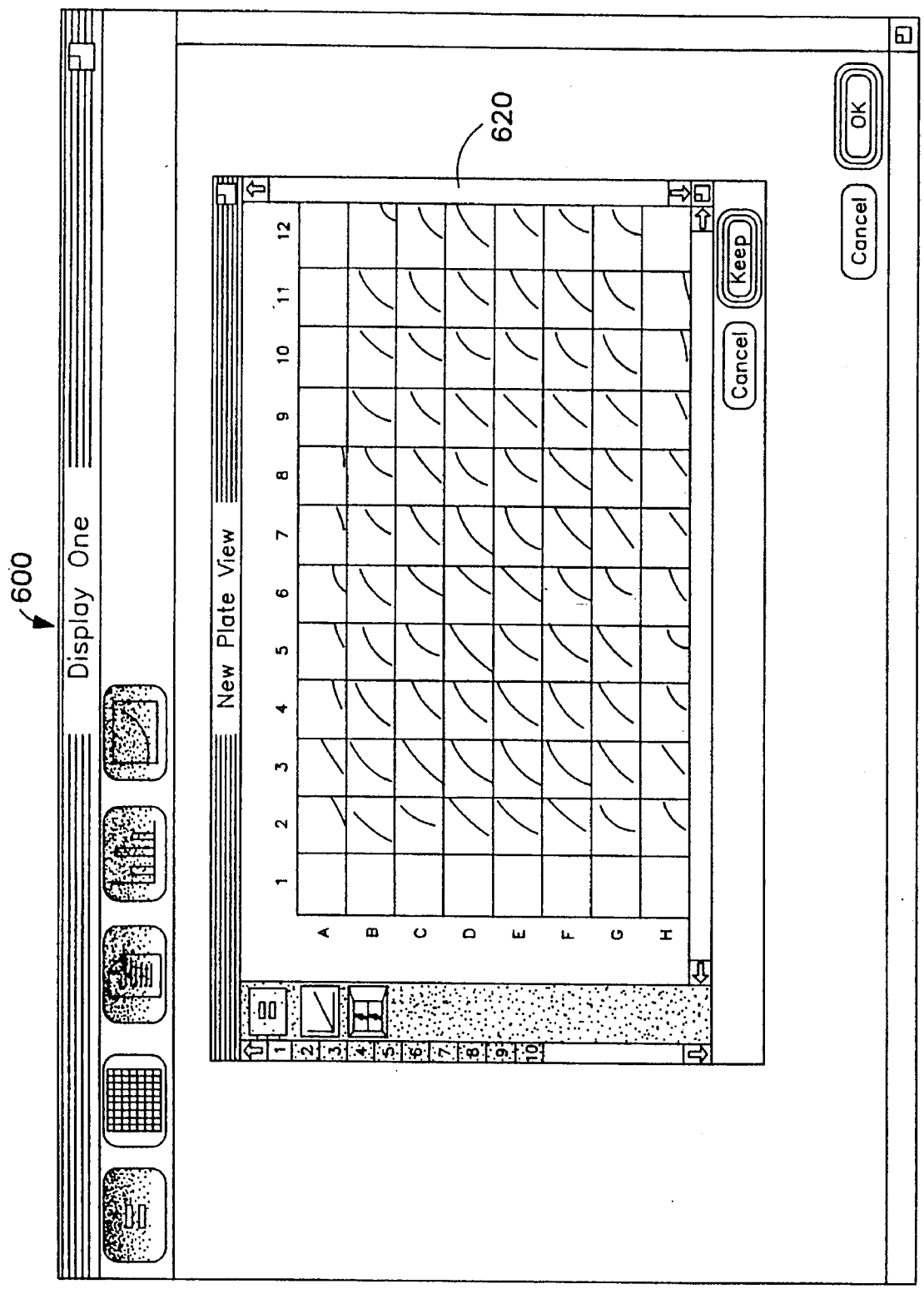
FIG. 6b illustrates a graph table in the window that appears when a data view icon in an experiment window is invoked according to an embodiment of the invention.

FIGS. 6a and 6b illustrates a window 600 associated with a data view icon according to one embodiment of the invention. In FIG. 6a, window 600 includes a table 602 that contains the actual values of data (which may be raw or derived) are shown in a table format. Typically, the each cell in table 602 will correspond to a specimen from which data has been collected.

In FIG. 6b, window 600 includes a table 620 in which each cell contains a graph. Table 620 may be used to illustrate data where multiple measurements were taken from the same specimens over a period of time. The x-axis of the graph in each cell may represent time while the y-axis of the graph in each cell may represent the value of the measurements taken for the specimens corresponding to the cell.

ANALYSIS ICONS

As mentioned above, specimens that have a particular significance may be assigned special labels. A user may define standard graphs based on such special labels. Once the data is collected, the data gathered from the specimens that were assigned the special labels is used to generated the standard graphs.

To define a standard graph, a user makes a copy of the analysis icon 218 in the experiment design region 206. In the present example, an analysis icon 240 has been copied into the experiment design region 206 and associated with data view icon 244. Analysis icon 240 may alternatively have been associated with database icons 236, 248 or both database icons 236 and 248. The analysis icon 240 uses labels established with the data correlation icons 238 and 239 to present data related by these assignments. Furthermore, the analysis icon 240 may use derived data calculated according to the data view icon 244.

Figure 7:
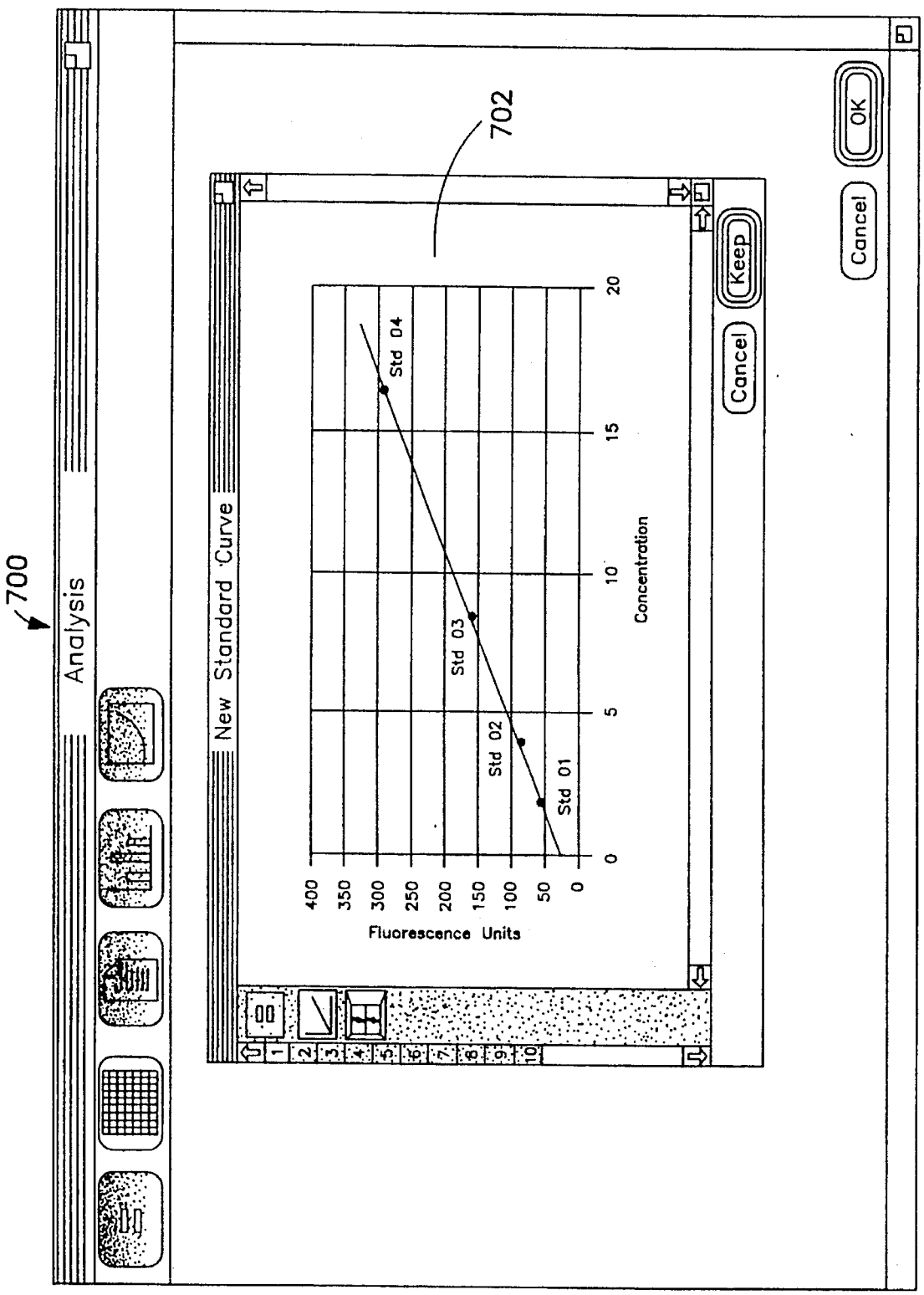
FIG. 7 illustrates the window that appears when an analysis icon in an experiment window is invoked according to an embodiment of the invention.

FIG. 7 illustrates a window 700 associated with an analysis icon according to one embodiment of the invention. In window 700, a graph 702 is displayed using values acquired from the specimens associated with the labels Std 01, Std 02, Std 03 and Std 04.

REPORT ICONS

Finally, it may be desirable to generate a report to document the outcome of the experiment. The report generation process may be automated by copying the report icon 216 into the experiment design region 206. In the present example, a report icon 242 in experiment design region 206 has been associated with analysis icon 240. A window associated with report icon 242 may be invoked to specify the details of the report.

Because report icon 242 is associated with analysis icon 240, the report generated in response to report icon 242 may include graphs and tables generated responsive to analysis icon 240, graphs and tables generated responsive to data view icon, and may include the data generated during either or both of the series of operations using the labels assigned by data correlation icons 238 and 239.

The window associated with report icon 242 is used to integrate into one or more documents the information gathered during a particular experiment. For example, the window may include slots or frames into which tables and data may be embedded, linked, or copied. Optionally, the window may includes controls for performing data display and formatting operations analogous to those employed by desktop publishing and word processing applications.

As is evident from the foregoing, all phases of an experiment, from data collection to report generation, may be established though placement and association of icons in experiment design region 206. However, the series of operations that comprise an experiment may involve more than the mere collection of data. To specify the operations to be performed in a particular series of operations, a user invokes a window associated with the scheduler icon that represents the series of operations. For example, to specify the operations to be performed by devices 104, 106 and 108 in the first series of operations of the experiment diagrammed in FIG. 2, a user invokes the window associated with scheduler icon 234. The windows associated with scheduler icons that are displayed after the user first invokes the icon shall be referred to hereafter as scheduler windows.

THE SCHEDULER WINDOW

Figure 8:
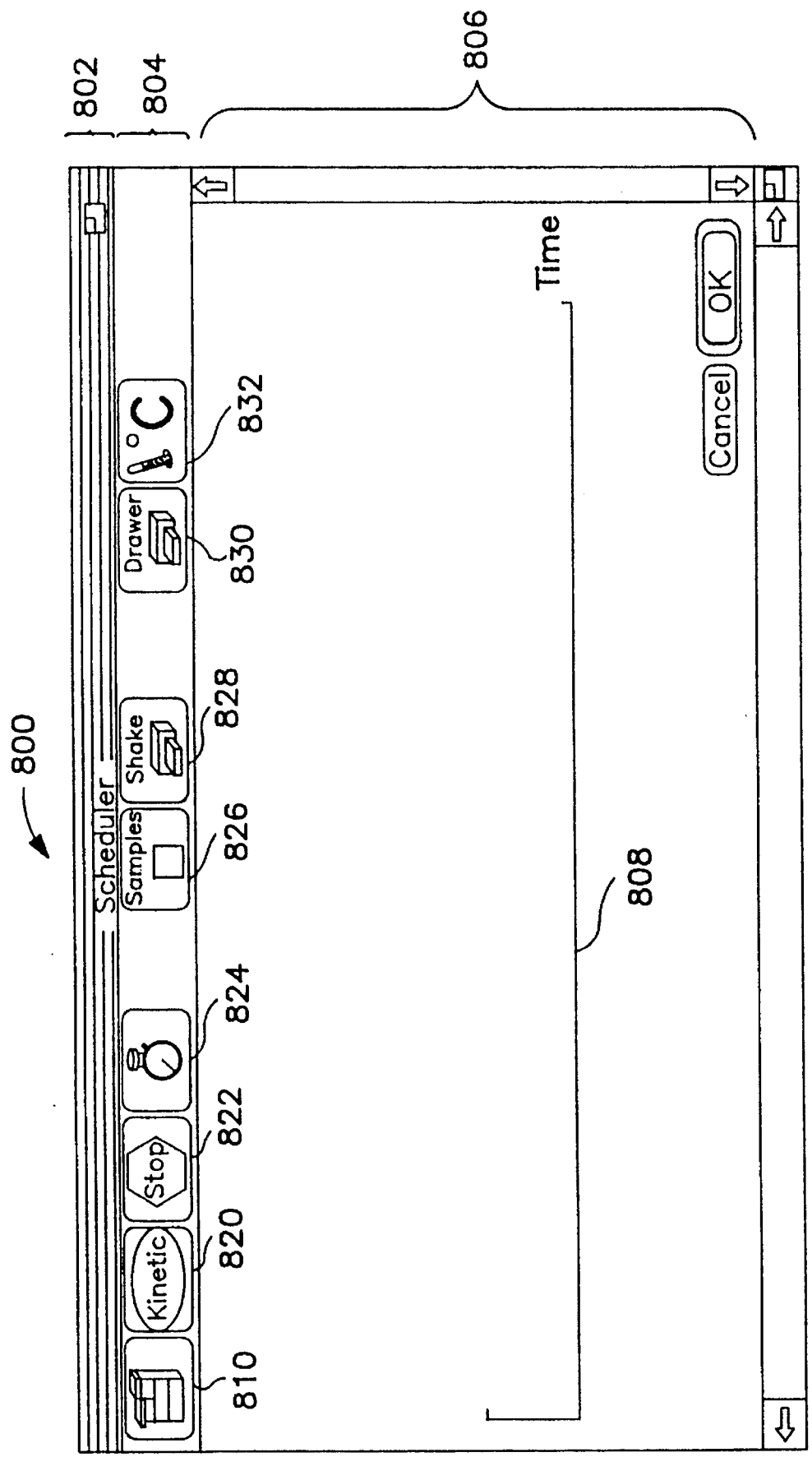
FIG. 8 illustrates a scheduler window according to an embodiment of the invention.

FIG. 8 illustrates a scheduler window 800 according to one embodiment of the invention. Scheduler window 800 includes a title bar 802, an icon bar 804, and an icon sequence region 806. The icon sequence region 806 includes a time line 808. A user builds a schedule of operations by placing copies of icons from icon bar 804 onto time line 808. The particular icons copied from icon bar 804 determine which operations are to be performed and which devices will perform the operations. The sequence of the icons on time line 808 determines the order in which the operations will be performed.

Each icon on icon bar 804 has a predefined function. Preferably, icon bar 804 contains at least three general types of icons: device icons, sequence control icons, and operation icons. In general, the device icons are used to specify the external devices which will perform the operations required in the experiment. Sequence control icons are used to customize the sequence of specified operations. Operation icons are used to specify the operations to be performed by the specified instruments.

A user builds a schedule of operations by copying icons from icon bar 804 onto time line 808 in a desired sequence. Once a sequence of icons has been placed on time line 808, a user may cause computer 102 to drive external devices to perform the schedule of operations according to the sequence of icons on time line 808. Specifically, computer 102 sends control signals to the external devices specified by device icons in the icon sequence. The control signals cause the external devices to perform the operations specified by the operation icons in the icon sequence. Computer 102 controls the timing of the control signals so that the external devices perform the operations in a sequence dictated by the sequence of the icons on time line 808. The sequence of operations is determined according to a general sequencing rule, as modified by any sequence control icons in the icon sequence.

The general sequencing rule may be, for example, that operations are performed from left to right according to the relative positions of the operation icons corresponding to the operations. Consider, for example, a sequence of icons on time line 808 that includes two operation icons OIC1 and OIC2. If icon OIC1 is to the left of icon OIC2 in the sequence, then computer 102 will send a control signal to cause the operation specified by icon OIC1 to be performed prior to sending a control signal to cause the operation specified by icon OIC2 to be performed.

As shall be explained hereafter, sequence control icons may be used to modify the general sequencing rule. For example, sequence control icons may specify that the operation specified by icon OIC1 is to be performed ten times before performing the operation specified by icon OIC2.

As explained above, device icons specify devices while operation icons specify operations to be performed by devices. When the sequence of icons on time line 808 includes numerous device icons and operation icons, there must be a rule to determine the correspondence between the device icons and the operation icons. The operation-instrument association role may be, for example, that an operation specified by an operation icon is performed by the instrument specified by the first device icon to the right of the operation icon. Consider, for example, the icon sequence (from left to right) OIC1, OIC2, IIC1, OIC3, IIC2, where OIC1, OIC2 and OIC3 are operation icons and IIC1 and IIC2 are device icons. The operations specified by the operation icons OIC1 and OIC2 would be performed by the instrument specified by device icon IIC1, while the operations specified by the operation icon OIC3 would be performed by the instrument specified by device icon IIC2.

Assuming a left-to-right general sequencing rule, the operations would be performed as follows: First, the instrument specified by device icon IIC1 would perform the operation specified by operation icon OIC1. Next, the instrument specified by device icon IIC1 would perform the operation specified by operation icon OIC2. Finally, the instrument specified by device icon IIC2 would perform the operation specified by operation icon OIC3.

It should be noted that these general sequencing and operation-instrument association rules are only exemplary. Other rules may be adopted in alternative embodiments. For example, time line 808 may be vertical, and the general sequencing rule may be up-to-down or down-to-up. In addition, operation icons may be associated with device icons to the left of them, above them, or below them. For the purposes of explanation, it shall be assumed that the sequence rule is left-to-right and that the operation-instrument association rule is that operation icons tire associated with the device icon to their right.

PLACING ICONS ON THE TIME LINE

The placement of specific icons onto time line 808 in the scheduler window 800 shall now be described in greater detail. It should be noted that the embodiment that shall be described hereafter is merely exemplary. In the exemplary embodiment, the external devices are photometers. Photometers acquire data from specimens or "samples" on plates that are stored in "drawers". The operations a photometer may perform include data acquisition, opening and closing drawers, shaking samples, and measuring temperature. In the illustrated embodiment, device icons specify data acquisition operations in addition to specifying device/instrument setups. Thus, the illustrated device icons are both instrument and operation icons. However, in alternative embodiments, device icons do not specify operations, but only specify devices that will perform the operations that are specified by operation icons.

Figure 9A:
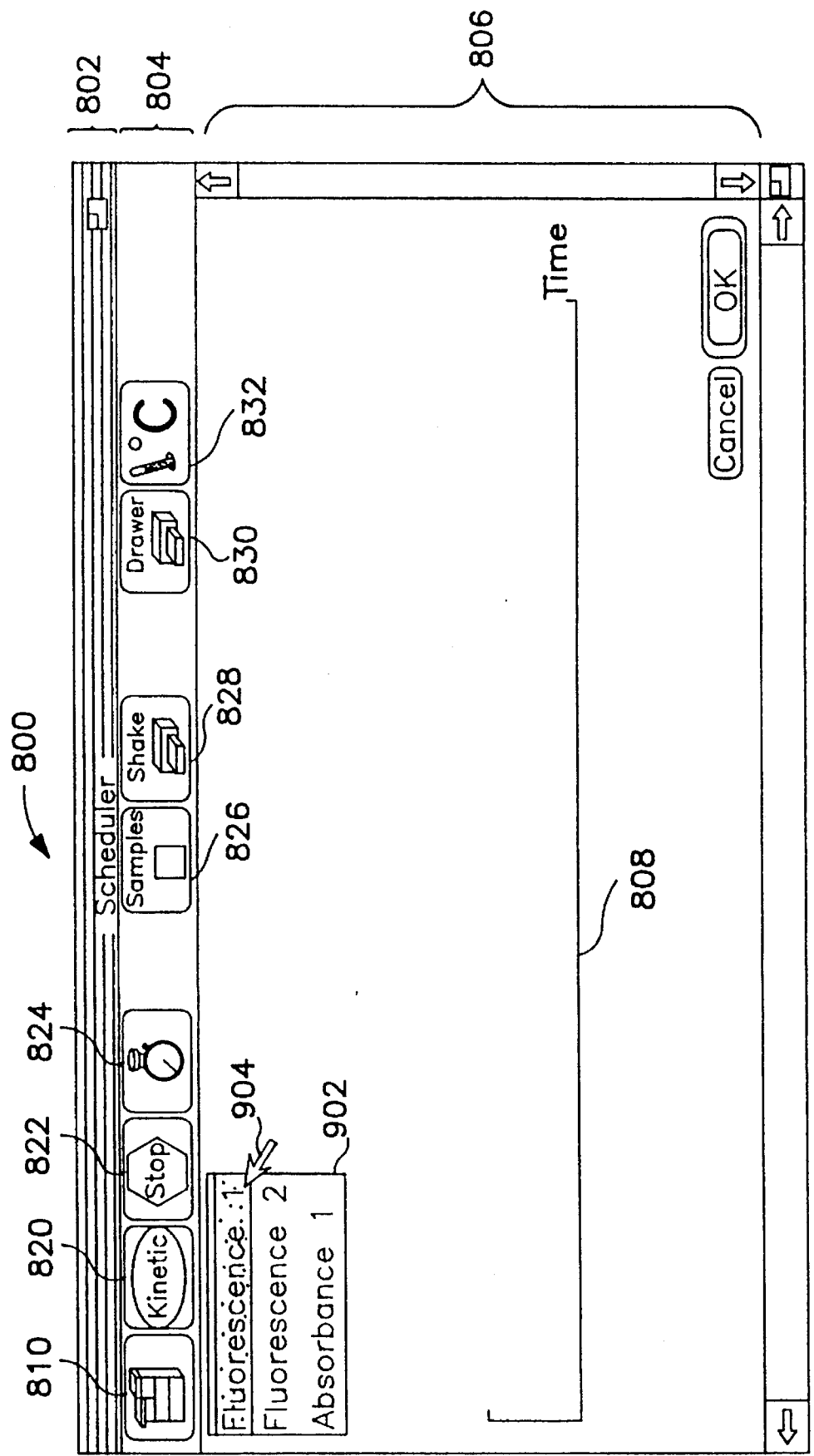
FIG. 9a illustrates a menu displayed when an a user selects the device icon from an icon bar of a scheduler window according to an embodiment of the invention.

Referring to FIG. 9a, when a user selects the device icon 810, a menu 902 of available instrument setups is displayed. The menu includes one instrument setup for each device icon linked to the scheduler icon associated with scheduler window 800. For example, assuming that scheduler window 800 is associated with scheduler icon 234, menu 902 will have one setup item for each of device icons 224, 226 and 228. Preferably, each instrument setup will be identified by the same label as is used to identify its associated device icon. For example, menu 902 may include of labels 250, 252 and 254. If desired, a user may detach menu 902 from device icon 810 by dragging menu 902 away from device icon 810 using cursor 904. When detached, menu 902 becomes a floating dialog box froth which the various instrument setups may be selected.

Figure 9B:
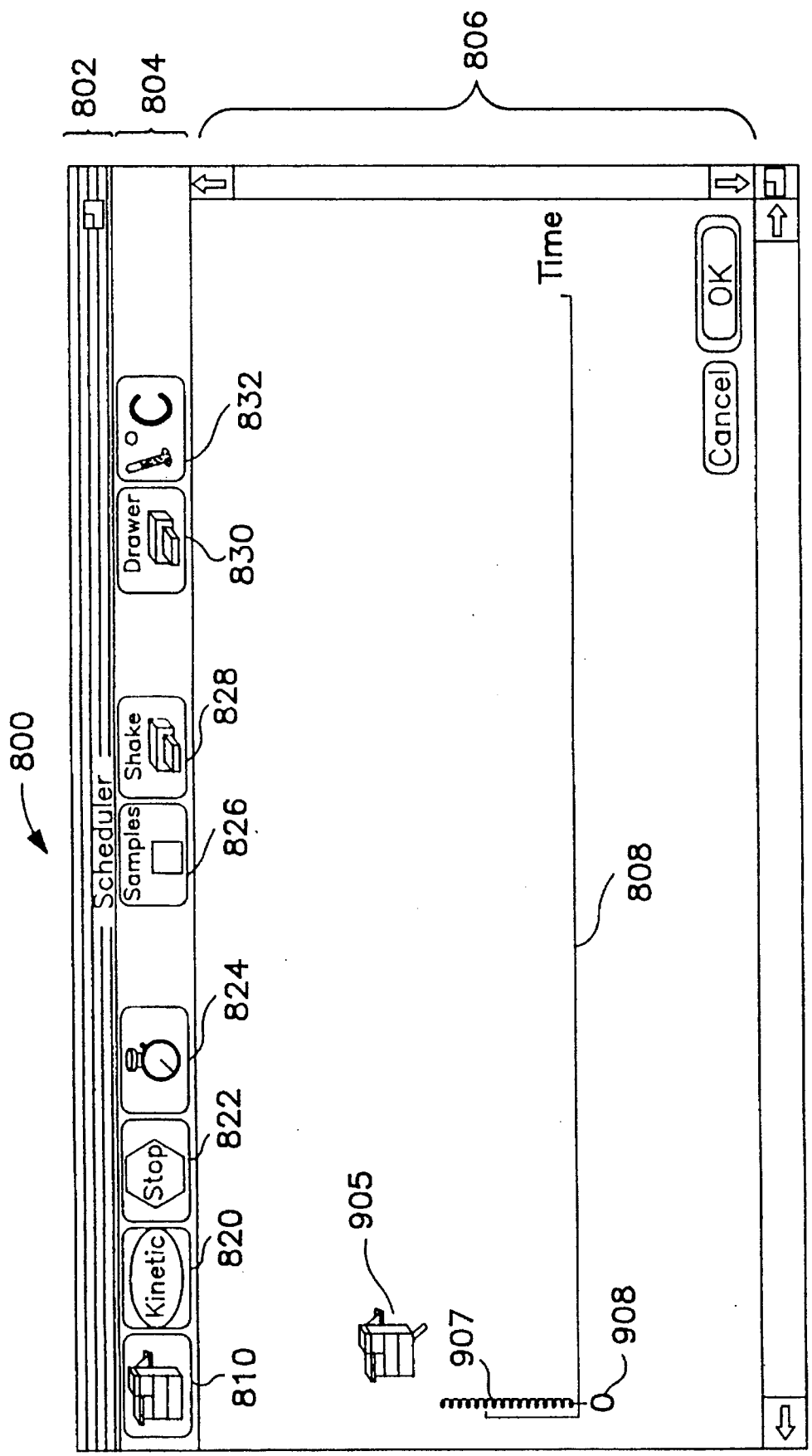
FIG. 9b illustrates a device icon/cursor according to an embodiment of the invention.

A user selects a particular instrument setup from menu 902 by highlighting the desired instrument setup label from menu 902 and releasing the mouse button. Once the desired instrument setup has been selected, the cursor 904 turns into a device icon/cursor 905 and menu 902 closes, as shown in FIG. 9b. Device icon/cursor 905 moves in response to the movement of mouse 114 just as cursor 904 did prior to selection of an instrument setup. An insertion line 907 appears on time line 808 below icon/cursor 905. Insertion line 907 indicates the specific location on time line 808 that a device icon will be inserted when the user invokes insertion (e.g. by clicking a button on mouse 114). At the insertion line 907 a time indication 908 appears under the time line 808.

Figure 9C:
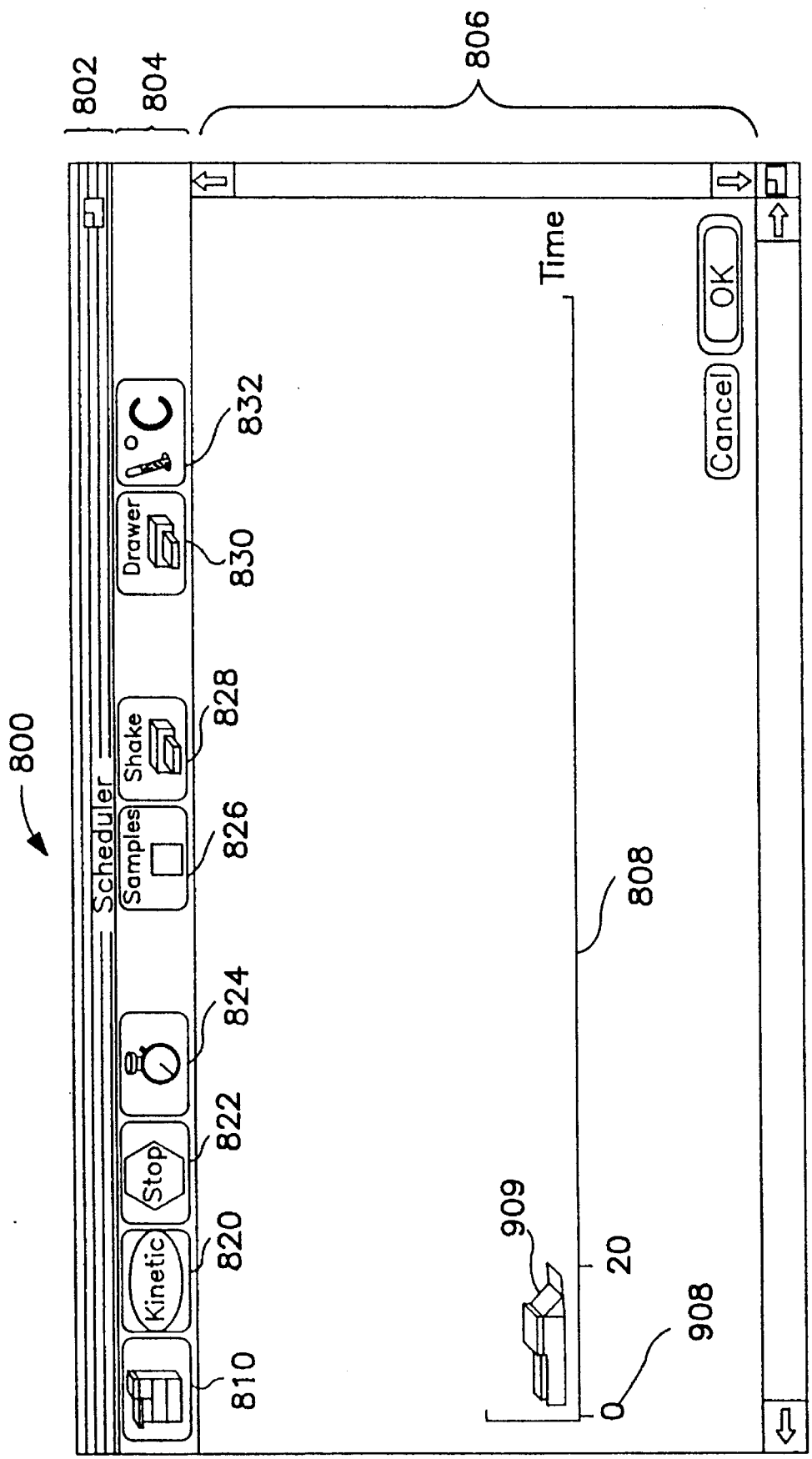
FIG. 9c illustrates a device icon inserted on a time line according to an embodiment of the invention.

After positioning device icon/cursor 905 so that insertion line 907 indicates the desired position on time line 808, a user causes icon insertion by clicking a button on mouse 114. In response, device icon/cursor 905 turns back into cursor 904 and a device icon 909 appears on time line 808 at the desired point, as shown in FIG. 9c. Because no other icons have yet been placed on time line 808, insertion line 907 assumes a default position, and device icon 909 is placed in the default position. In the illustrated embodiment, the default position is the leftmost portion of time line 808.

As illustrated, the device icon 810 on icon bar 804 need not be identical to the device icons (such as device icon 909) on time line 808. For example, device icon 810 depicts a generic device, while the device icons on time line 808 may reflect the specific device and instrument setup with which they are associated.

Sequence control icons include a kinetic icon 820, a stop icon 822, stopwatch icon 824 and a samples icon 826. These icons affect the sequence in which the operations specified on time line 808 will be performed. Copies of these icons may be placed on time line 808 in a manner similar to that described above with respect to the device icon.

Figure 9D:
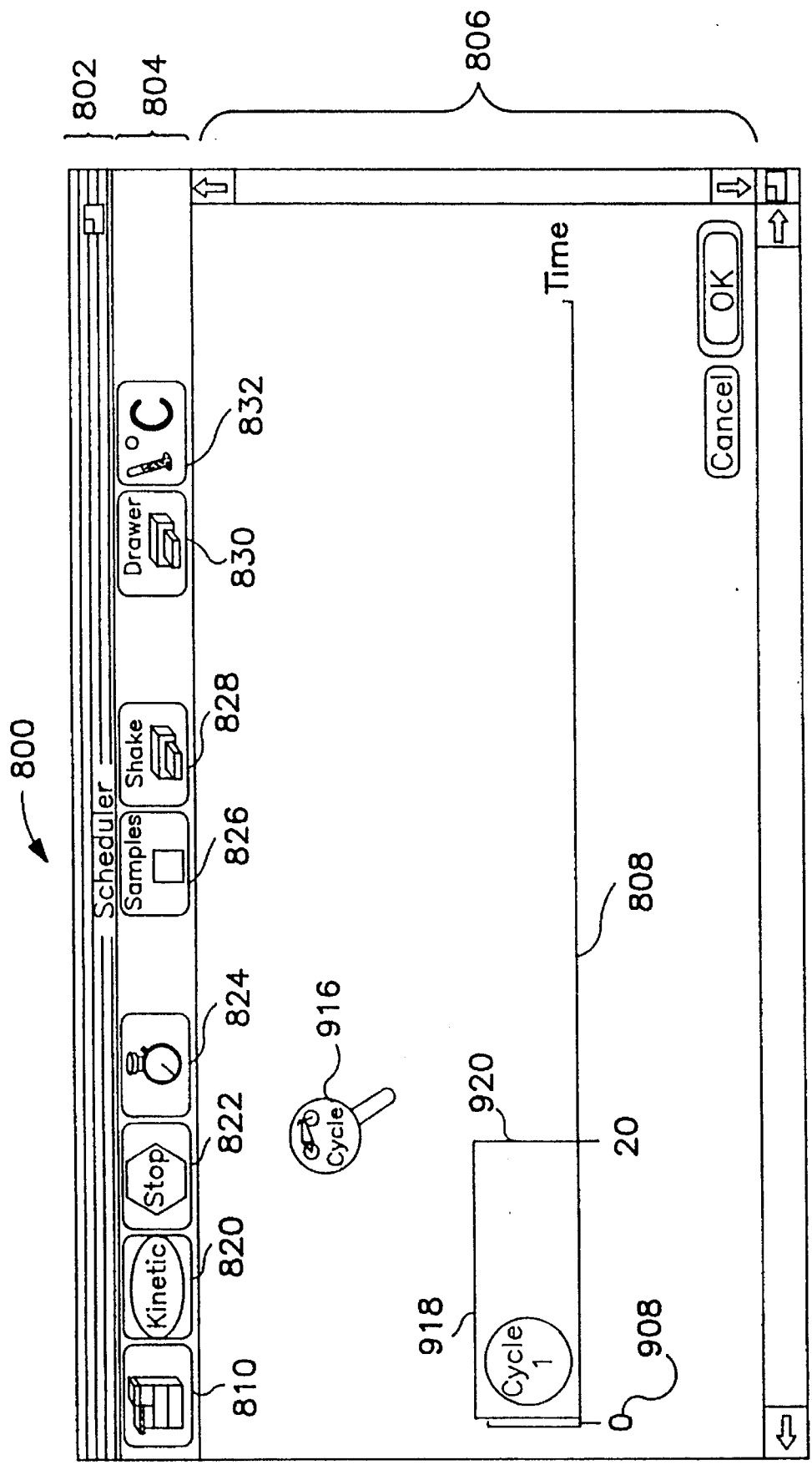
FIG. 9d illustrates a kinetic icon inserted on a time line according to an embodiment of the invention.

Specifically, a copy of the kinetic icon 820 may be placed on time line 808 by selecting the kinetic icon 820 on icon bar 804. The cursor 904 will then become a kinetic icon/cursor 916, as shown in FIG. 9d. When kinetic icon/cursor 916 is positioned at a desired point on time line 808 (as indicated by an insertion line) and the mouse button is clicked, kinetic icon/cursor 916 turns back into cursor 904 and a kinetic icon 918 appears on time line 808 at the desired point.

A kinetic icon 918 on time line 808 indicates that a group of operations is to be repeated for a particular number of cycles. The operations which are affected by the kinetic icon 918 (the "target operations") are those operations specified by operation icons encompassed by a shaded box 920 which extends from kinetic icon 918. Shaded box 920 may be extended over any number of icons. Shaded box 920 may even enclose another kinetic icon and its target icons.

Figure 10:
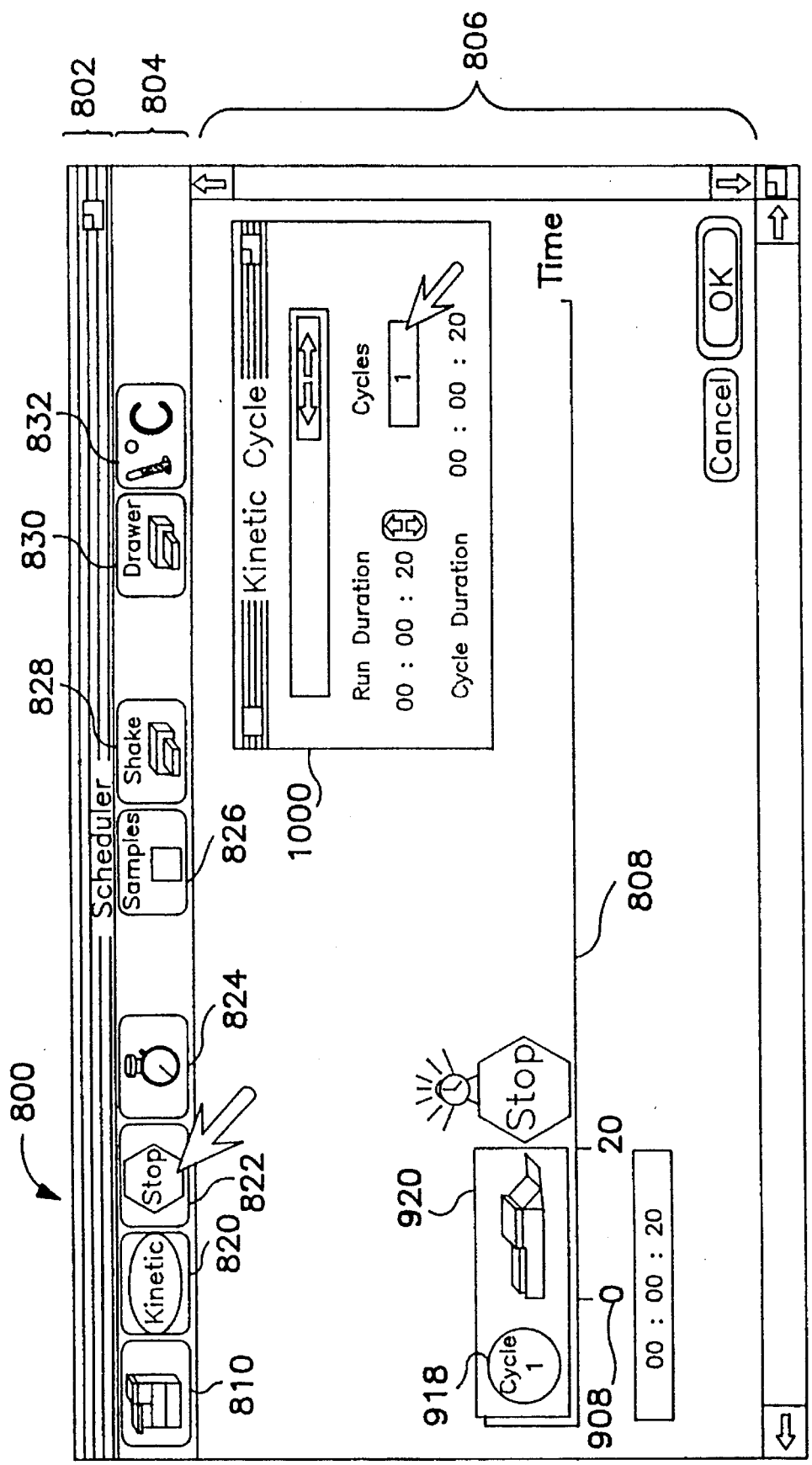
FIG. 10 illustrates a dialog box for establishing the duration of a kinetic period and a number of kinetic cycles according to an embodiment of the invention.

A kinetic cycle dialog box 1000, shown in FIG. 10, is displayed when a user double-clicks on kinetic icon 918. Dialog box 1000 displays the "cycle duration", which is the time required to perform all the target operations once, and includes controls for establishing a kinetic run duration and a number of kinetic cycles. The kinetic run duration is the total amount of time allocated to performance of the target operations. For example, assuming that a cycle duration is twenty seconds, then the target operations would be perforated once if the run duration is set to twenty seconds, twice if the run duration is set to forty seconds, etc. The number of cycles indicator in kinetic cycle dialog box 1000 will change to reflect the number of cycles that will be performed during given the specified run duration.

Rather than specify the kinetic run duration, a user may directly specify the number of times the target operations will be performed (the number of "kinetic cycles"). The run duration indicator in kinetic cycle dialog box 1000 will change to reflect the time required to perform the specified number of kinetic cycles. For example, if the cycle duration is twenty seconds and a user specifies two kinetic cycles, then the run duration will be forty seconds.

Similar to the device icon, the kinetic icon 820 on the icon bar 804 is generic, while kinetic icons (such as kinetic icon 918) reflect specific settings. In the case of kinetic icon 918, the icon reflects that one cycle of the operations corresponding to operation icons enveloped by shaded box 920 will be performed.

Figure 9E:
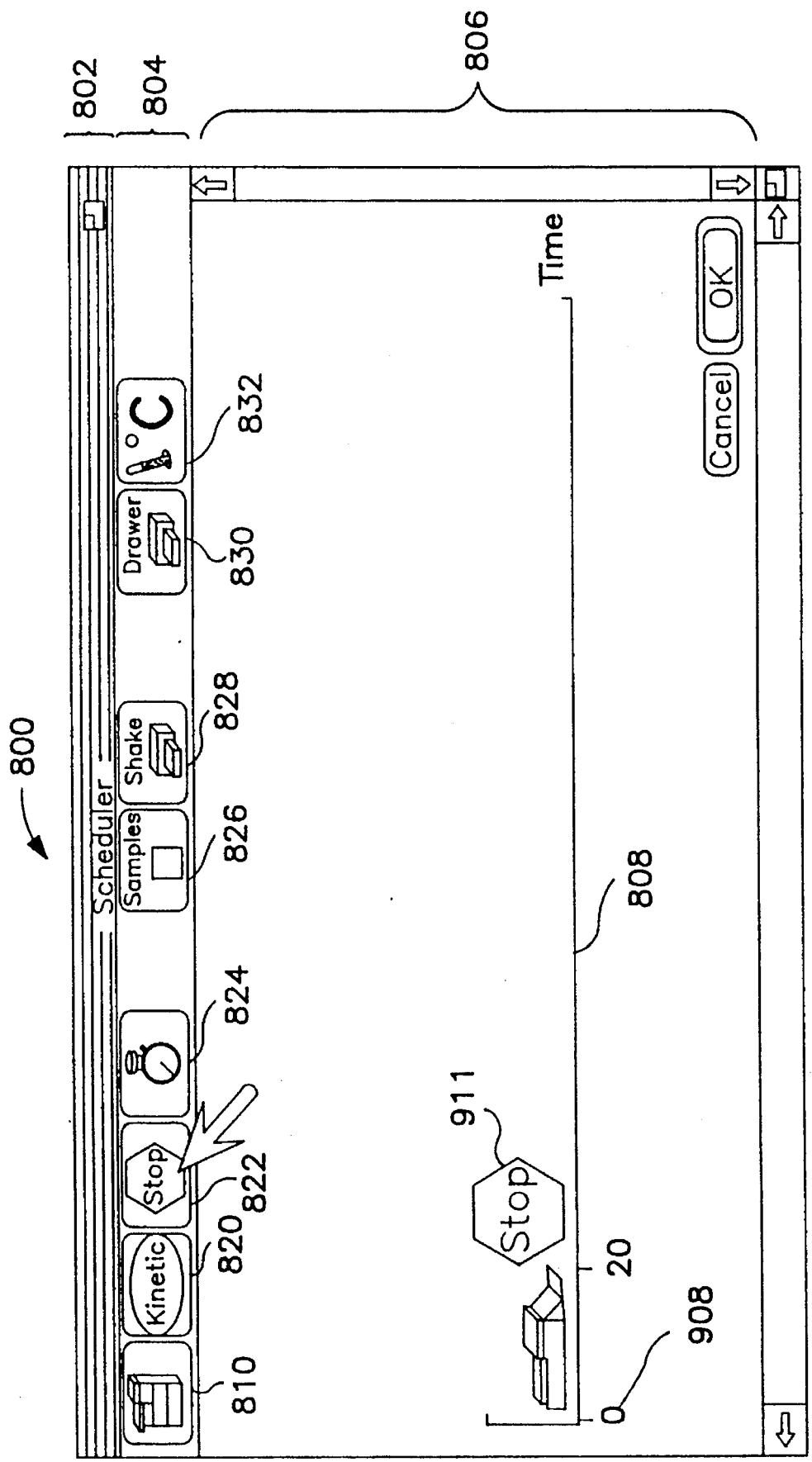
FIG. 9e illustrates a stop icon inserted on a time line according to an embodiment of the invention.
Figure 9F:
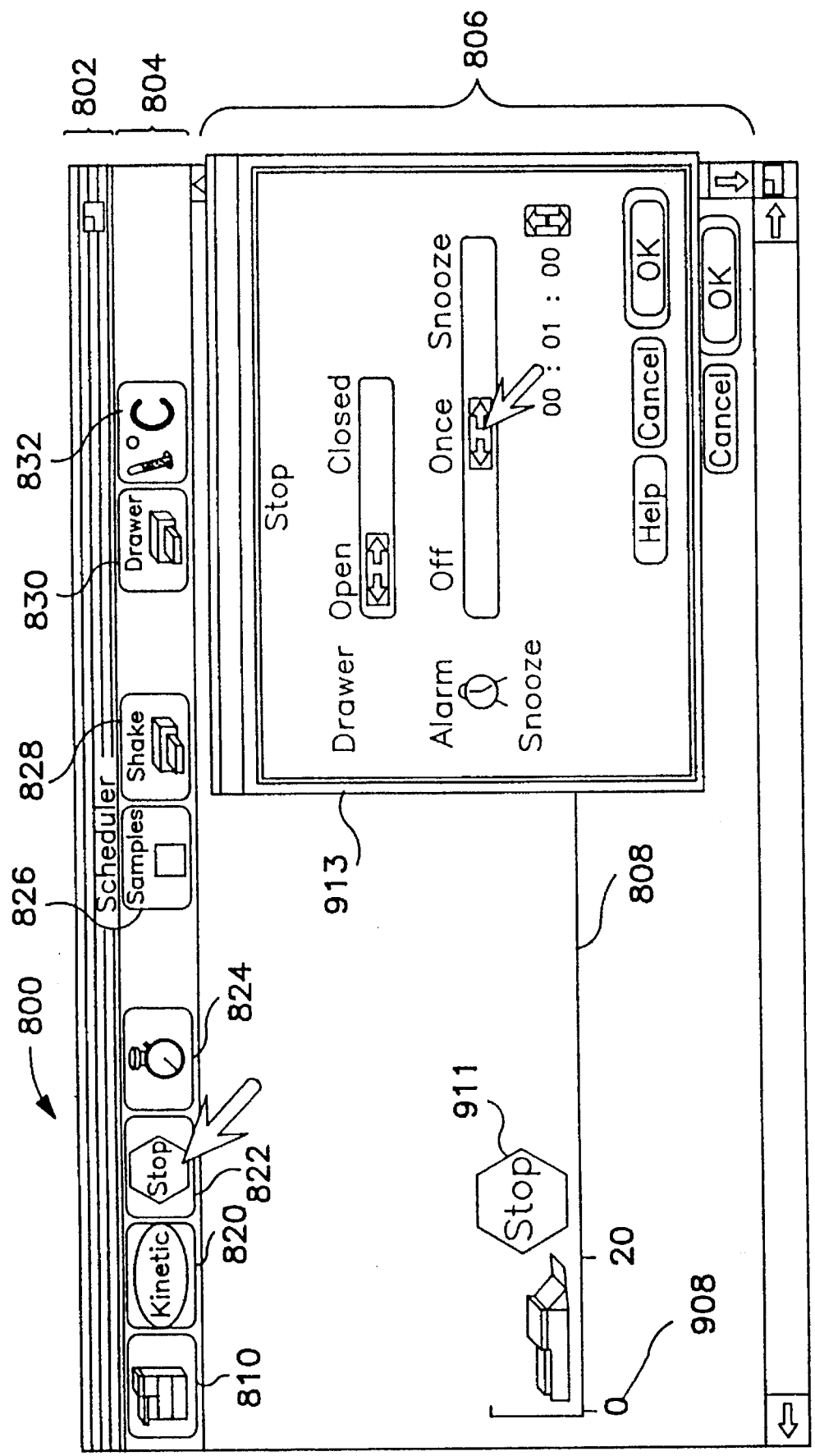
FIG. 9f illustrates a stop dialog box for specifying post-data acquisition operations according to an embodiment of the invention.

The stop icon 822 may be placed on time line 808 simply by clicking stop icon 822, as shown in FIG. 9e. When selected, a stop icon 911 is automatically inserted at the end of the icons on time line 808. Stop icon 911 indicates that all data generated during the operations specified by the operation icons preceding stop icon 911 on time line 808 has been collected. When stop icon 911 is selected (e.g. by double-clicking stop icon 911) a stop dialog box 913 appears, as illustrated in FIG. 9f. Stop dialog box 913 includes controls for specifying whether to sound an alarm when the data collection has been completed. The stop dialog box 913 may also have experiment-specific controls for specifying operations to be performed upon completion of the specified operations. For example, for experiments using drawers, the stop dialog box 913 may include controls for specifying whether a drawer should be open or closed upon completion of the specified data completion operations.

Figure 9G:
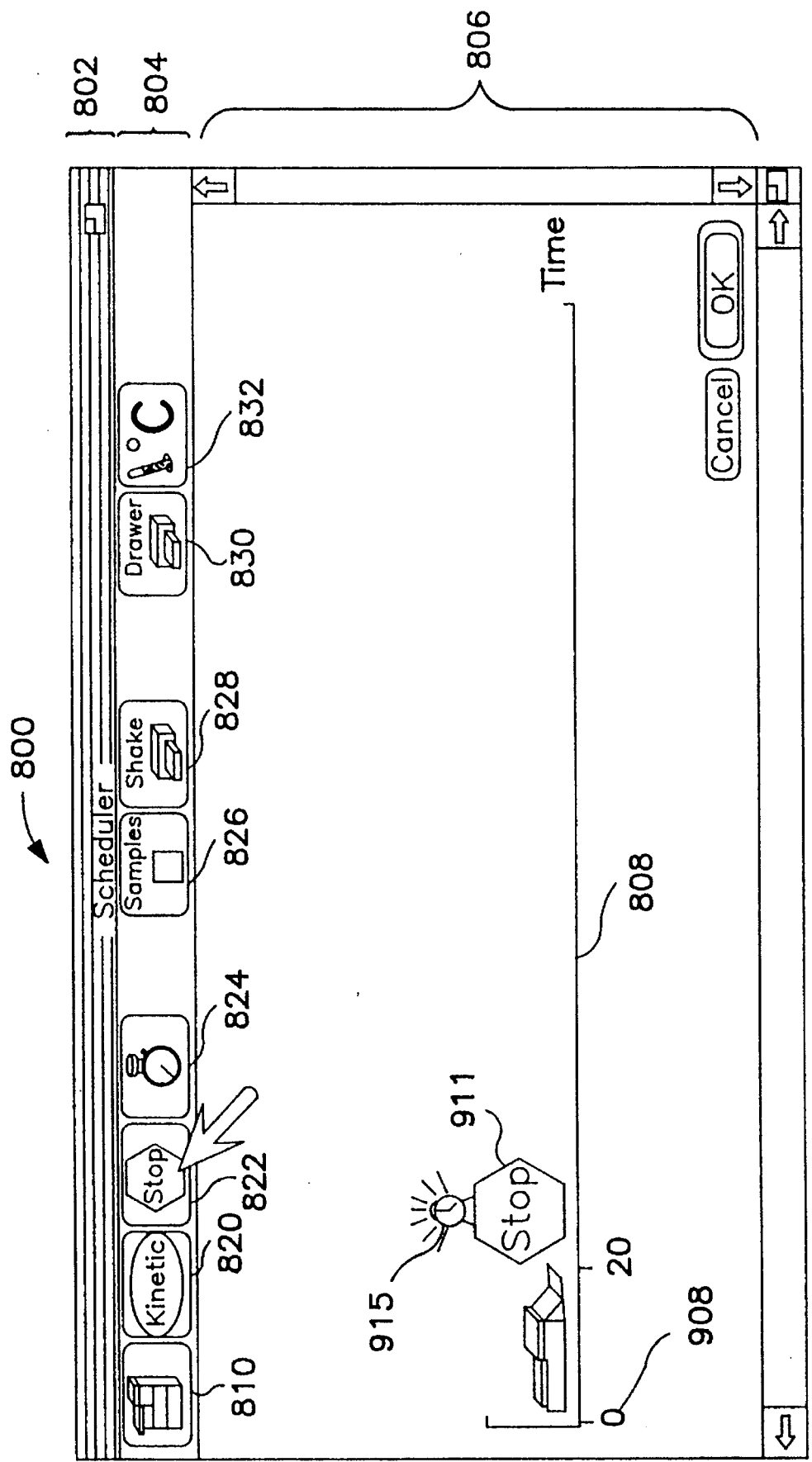
FIG. 9g illustrates a stop icon with an alarm indication according to an embodiment of the invention.

If a user specifies that an alarm will be sounded at the end of the specified operations, then stop icon 911 is preferably modified to visually reflect that an alarm is set. For example, a small alarm clock 915 may be displayed above stop icon 911, as shown in FIG. 9g.

Figure 9H:
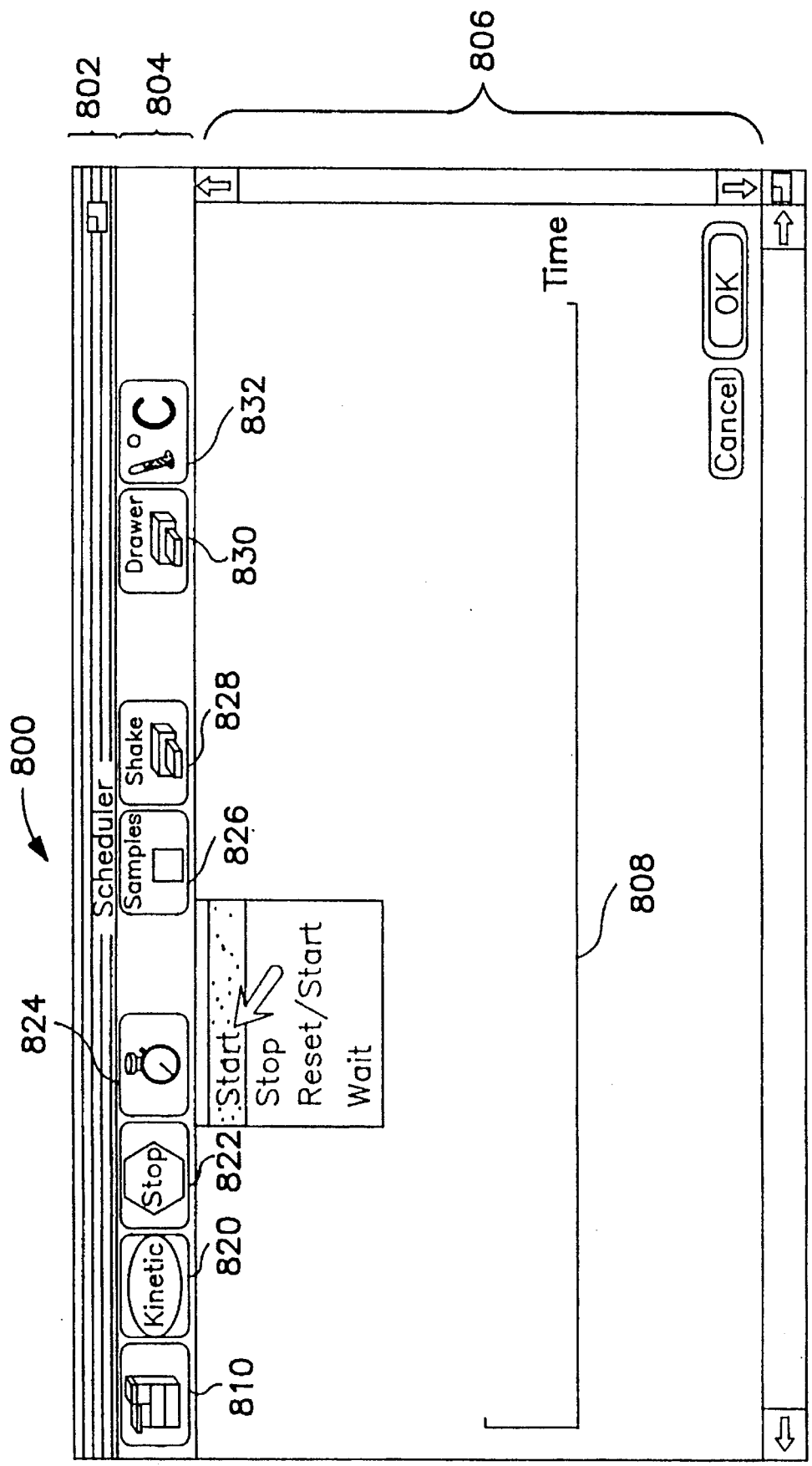
FIG. 9h illustrates a menu displayed when a stopwatch icon is selected form an icon bar of a scheduler window according to an embodiment of the invention.
Figure 9I:
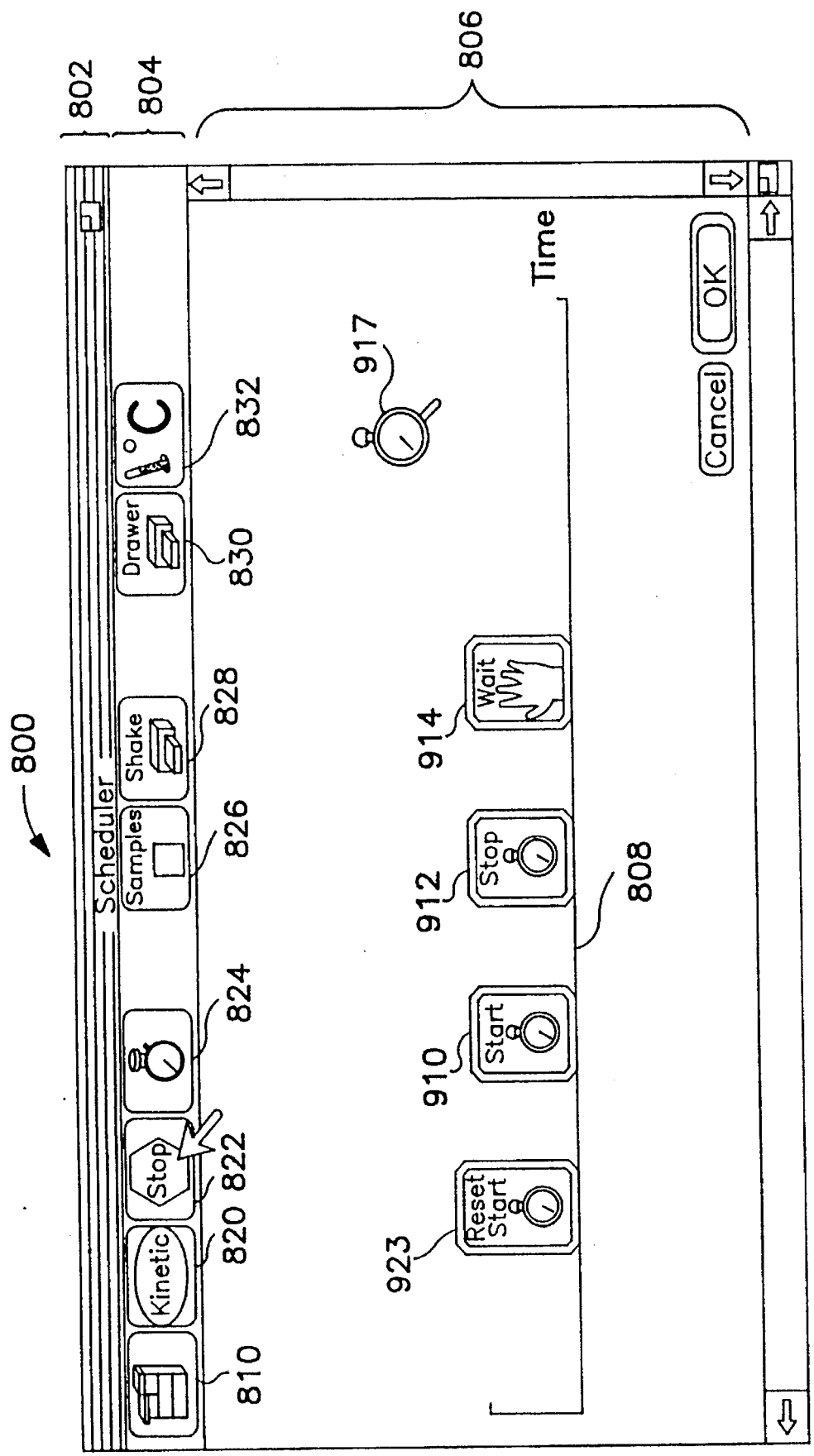
FIG. 9i illustrates a stopwatch cursor/icon and various stopwatch icons according to an embodiment of the invention.
Figure 9J:
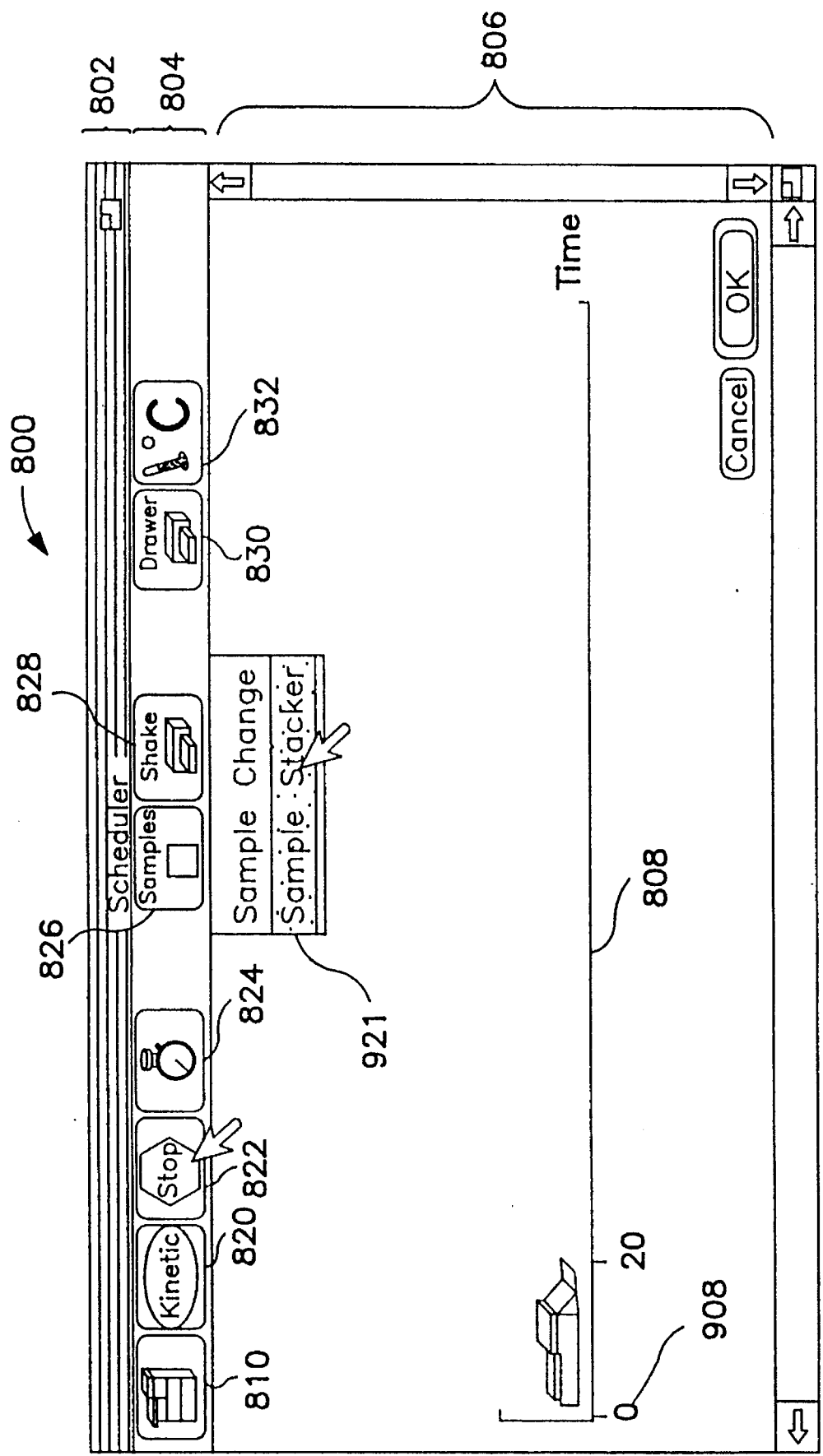
FIG. 9j illustrates a menu displayed when a sample icon is selected from an icon bar of a scheduler window according to an embodiment of the invention.

A copy of the samples icon 826 may be placed on time line 808 to specify that subsequent operations are to be performed on a different plate of specimens than the current plate of specimens. Samples icon 826 is copied to time line 808 in the same manner as the stopwatch icon 824. Specifically, when samples icon 826 is initially selected, a menu 921 is displayed, as shown in FIG. 9j. In the illustrated embodiment, menu 921 has two selectable options labeled "Sample Change" and "Sample Stacker". Selection of "Sample Change" specifies that a new plate of samples is to be added to an instrument. Selection of "Sample Stacker" specifies that operations are to be performed on specimens located on more than one plate of a stack of plates. Since photometers process one plate at a time, operations are repeated for each plate in the stack of plates.

Figure 9K:
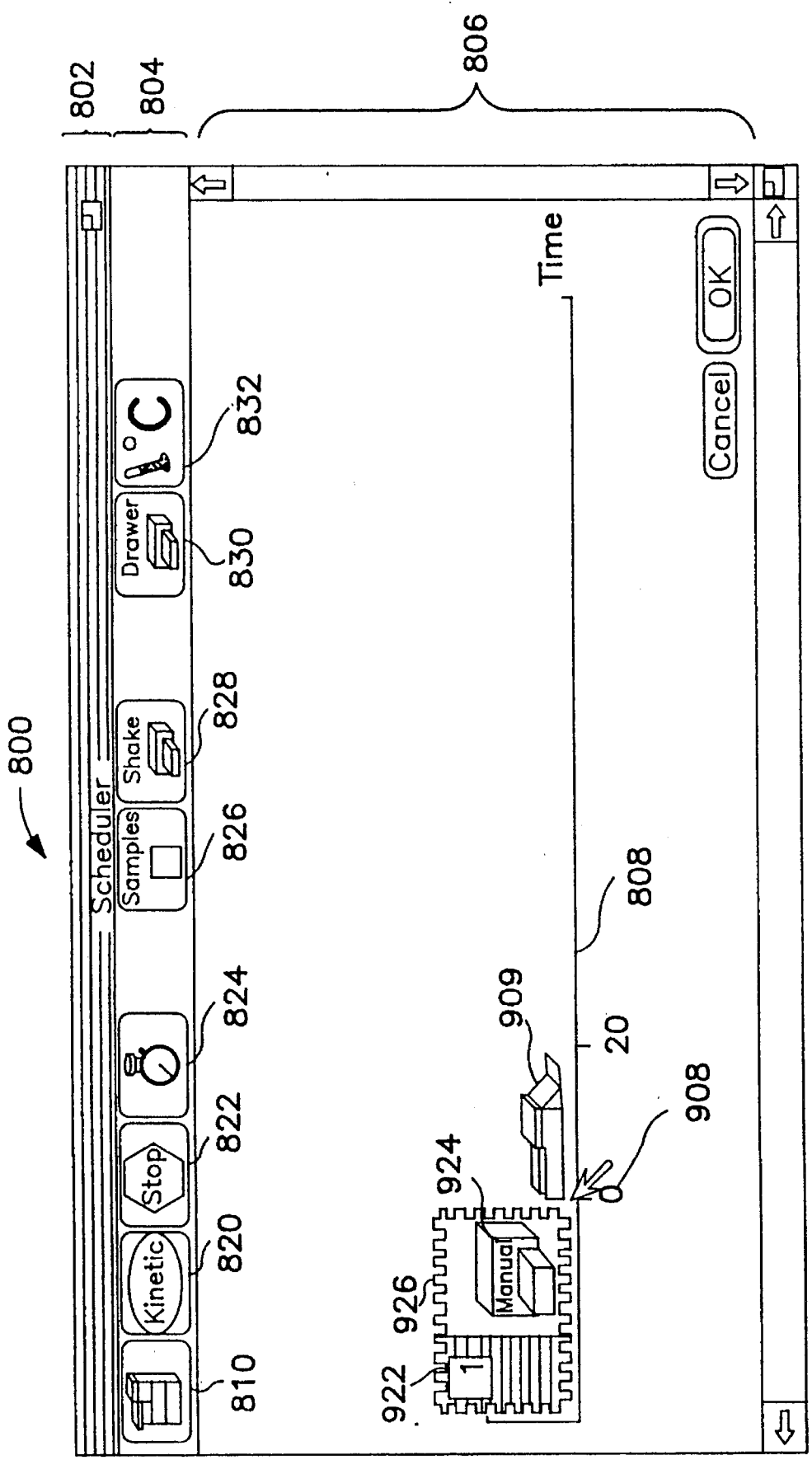
FIG. 9k illustrates a stacker icon on a time line according to an embodiment of the invention.
Figure 91:
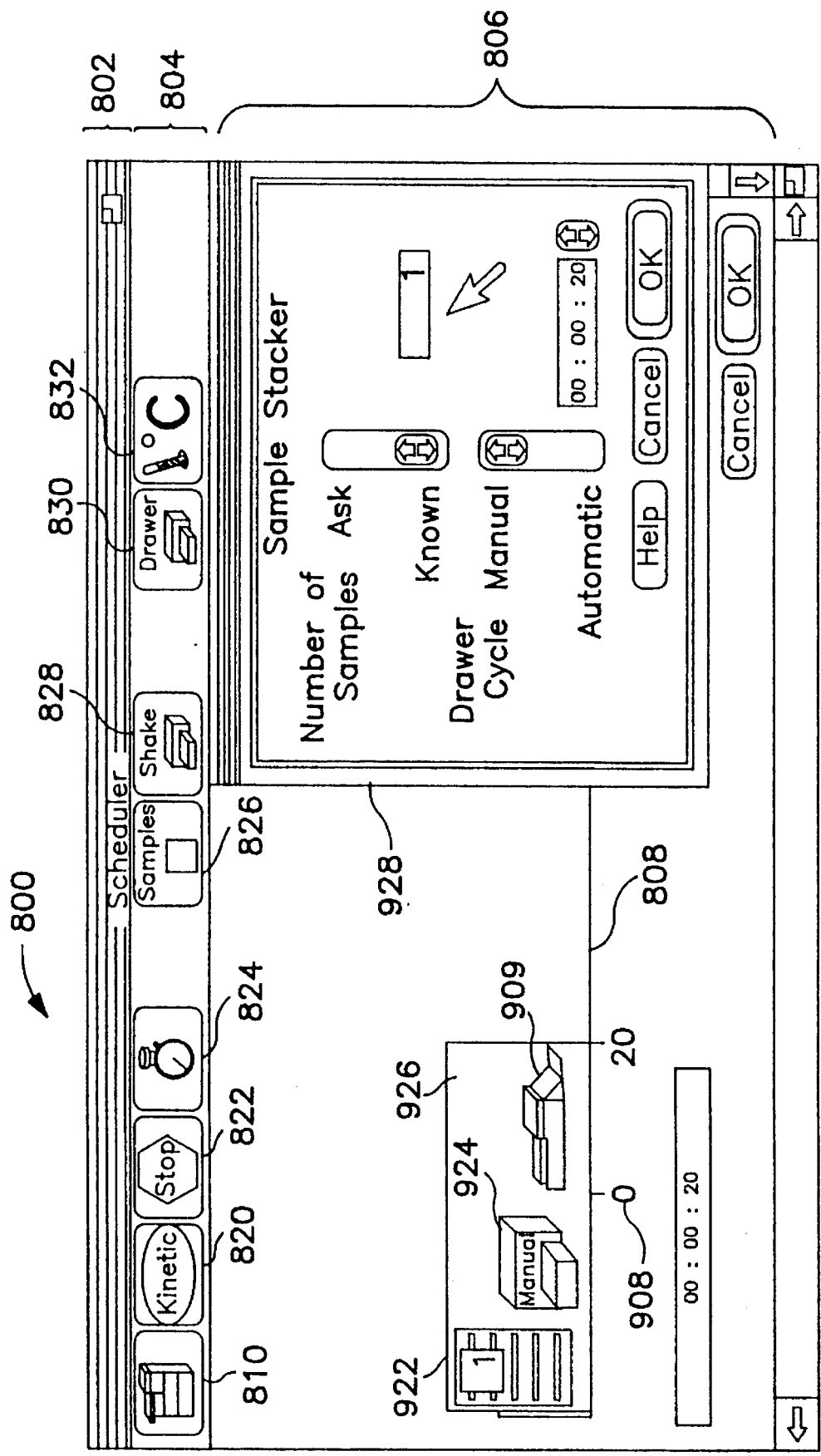

Once an option has been selected, menu 921 closes and a user can insert the selected type of sample icon on time line 808 by the insertion process described above. For the purposes of explanation, it shall be assumed that the "Sample Stacker" option was selected. Thus, upon selection of an insertion point, a stacker icon 922 will appear on time line 808 at the location indicated by the insertion line, as shown in FIG. 9k. In the illustrated embodiment, a drawer icon 924 automatically appears next to stacker icon 922. The drawer icon 924 is enveloped in a shaded box 926 extending from stacker icon 922. The shaded box 926 may be extended to envelop additional icons, as shown in FIG. 9l.

Stacker icon 922 operates similar to kinetic icon 918 in that all of the target operations enveloped in shaded box 926 are repeated for a specified number of cycles. However, stacker icon 922 is used when the target operations are to be performed on different specimens during each cycle, while kinetic icon 918 is used when the target operations are to be repeatedly performed on the same set of specimens. Drawer icon 924 is automatically displayed immediately after stacker icon 922 because, in the illustrated embodiment, the switching of specimen plates always involves a drawer operation.

When stacker icon 922 is selected, a stacker dialog box 928 is displayed. Stacker dialog box 928 contains controls which allow a user to select "Ask" or "Known", and to select either "Manual" or "Automatic". If "Ask" is selected, a dialog box will appear before the data gathering operation is performed which asks the number of sample plates from which the data will be gathered. The stacker icon 922 will show a question mark to indicate that the sample number is not known. If "Known" is selected, a user may enter the number of sample plates from which data will be collected. The stacker icon 922 will show the number plates, as specified by the user.

If "Manual" is selected, the user must cue computer 102 to continue with a data acquisition cycle by, for example, pressing a designated key on keyboard 113 or select a particular part of the displayed dialog box with the movement of the mouse 114 and the cursor. If "Automatic" is selected, the user may specify the time a drawer corresponding to drawer icon 924 remains open during each data acquisition cycle. This allows the user to feed sample plates into the instrument corresponding to device icon 909 without having to cue computer 102 to continue.

The operation icons displayed on operation icon bar 804 will vary based on the instrument setups associated with scheduler window 800. In the illustrated embodiment, the instrument setups specify setups for photometers. Operations which may be performed by photometers include data acquisition, drawer operations, temperature sensing and specimen shaking. Therefore, icon bar 804 includes a drawer icon 830, a temperature icon 832 and a shake icon 828. Icon bar 804 does not include a data acquisition icon because, in the illustrated embodiment, device icon 810 serves to specify both an instrument and a data acquisition operation.

Figure 9M:
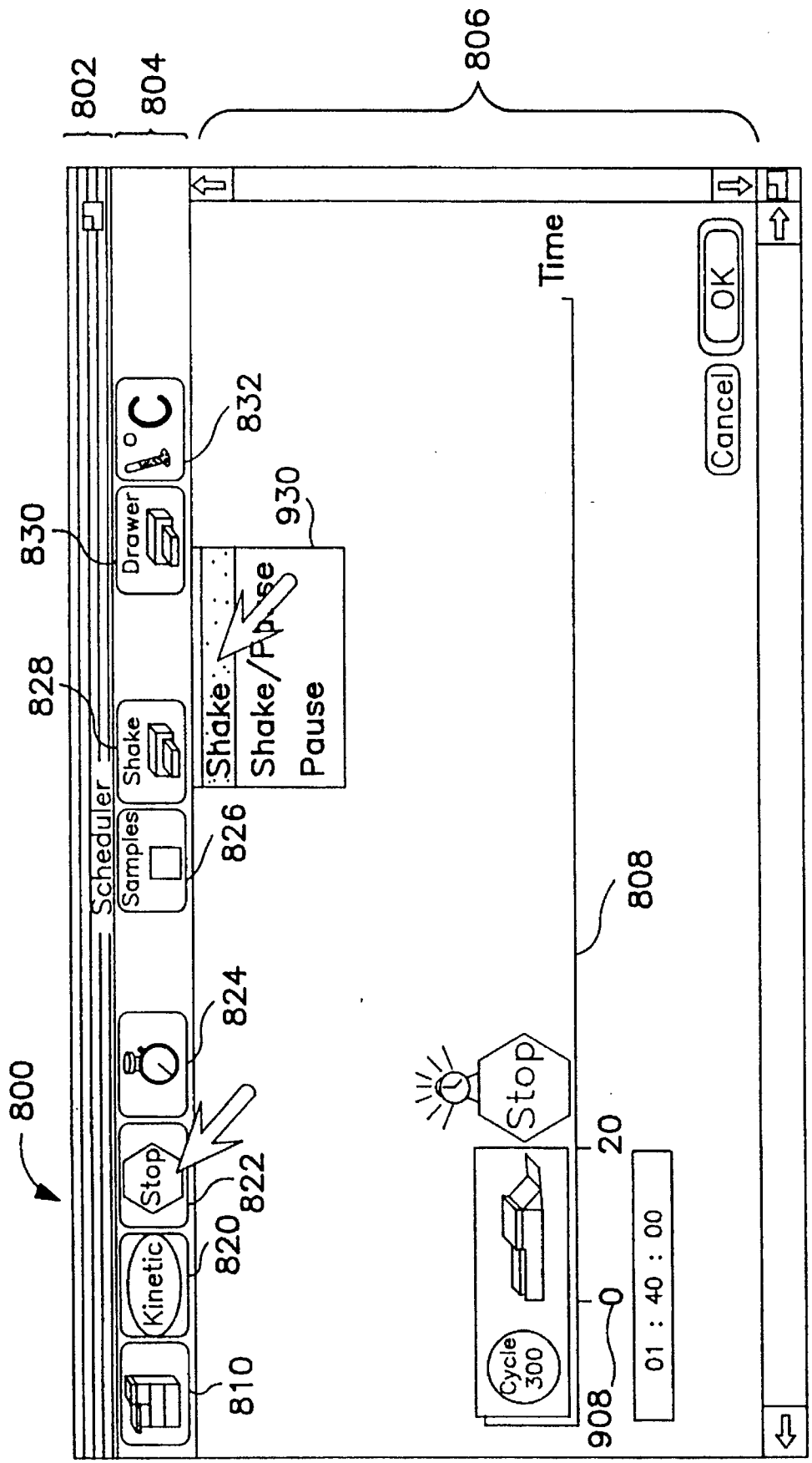
FIG. 9m illustrates a shake menu displayed when a shake icon on an icon bar is selected according to an embodiment of the invention.
Figure 9N:
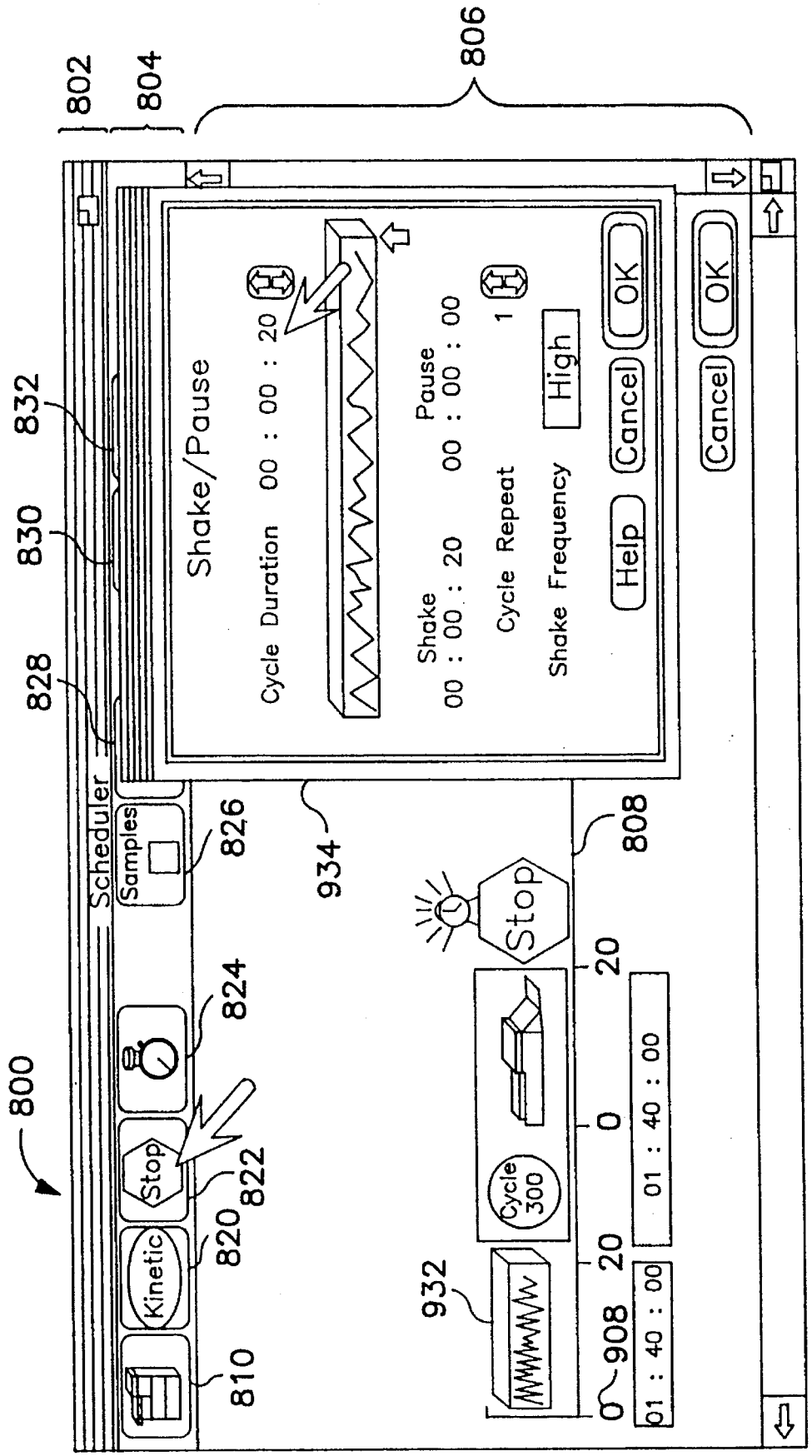
FIG. 9n illustrates a shake dialog box according to an embodiment of the invention.

A shake icon is inserted into the time line 808 by selecting shake icon 828. In response to selection of shake icon 828, a shake menu 930 is displayed, as illustrated in FIG. 9m. Shake menu 930 includes a plurality of selectable options, including "Shake", "Shake/Pause", and "Pause". Upon selection of one of the options, a user may insert a shake icon 932 into the icon sequence on time line 808, as shown in FIG. 9n.

Upon insertion of shake icon 932 into the icon sequence on time line 808, a shake dialog box 934 is displayed. The shake dialog box 934 includes controls which allow a user to specify the duration and frequency of shakes. Specifically, a user may specify a shake frequency, a cycle duration (the total time of a shake cycle), and the amount of the cycle duration that is allocated to shaking and pausing.

The cycle duration is divided into two periods: a shaking period and a pause period. During the shaking period, the photometer associated with the shake icon 932 will shake its sample plate. During the pause period, the photometer will not shake its sample plate. Controls in shake dialog box 934 allow a user to specify the relative durations of the shaking period and the pause period. When "Shake" is selected from shake menu 930, the entire shake cycle is initially allocated to the shaking period. When "Pause" is selected, the entire shake cycle is initially allocated to the pause period. When "Shake/Pause" is selected, the shake cycle is initially divided between the shake period and the pause period. The shake frequency, which may be "High", "Medium" or "Low" in the illustrated embodiment, determines the shaking frequency during the shake period. Shake dialog box 934 also includes controls which allow a user to specify that the entire cycle duration be repeated a specified number of times.

Figure 9O:
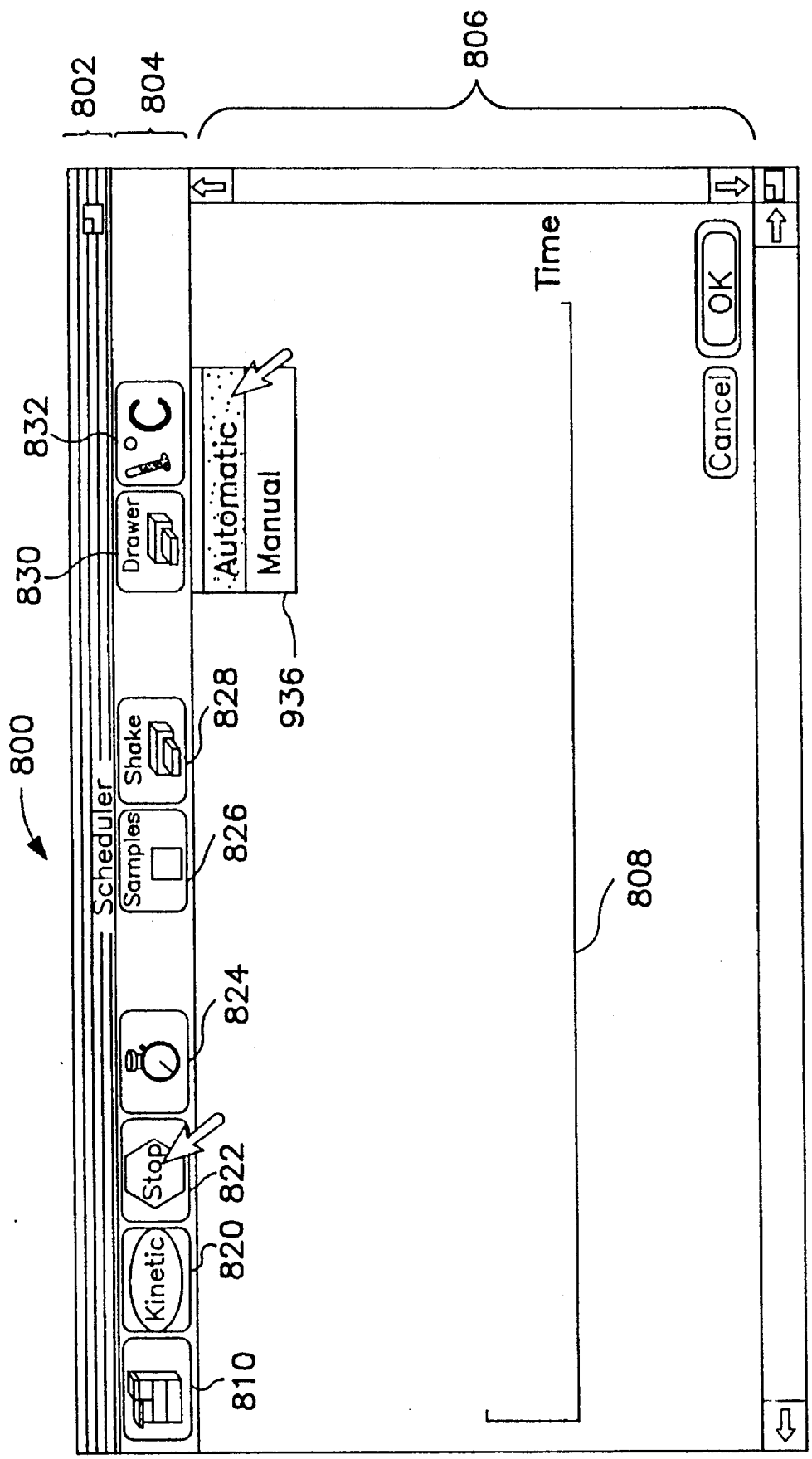
FIG. 9o illustrates a drawer menu displayed when a drawer icon is selected from an icon bar according to an embodiment of the invention.

Drawer icon 830 is used to specify a drawer-related operation. Upon selection of drawer icon 830, a drawer menu 936 is displayed in FIG. 9o. Drawer menu 936 has the selectable options "Automatic" and "Manual". Selection of "Automatic" specifies that a drawer will be automatically opened, remain open for a designated period of time, and then will be automatically closes. Selection of "Manual" specifies that a drawer will be automatically opened but will not be closed until a user either presses a designated key on keyboard 113 or presses the close drawer button on the instrument that will perform the drawer operation.

Figure 9P:
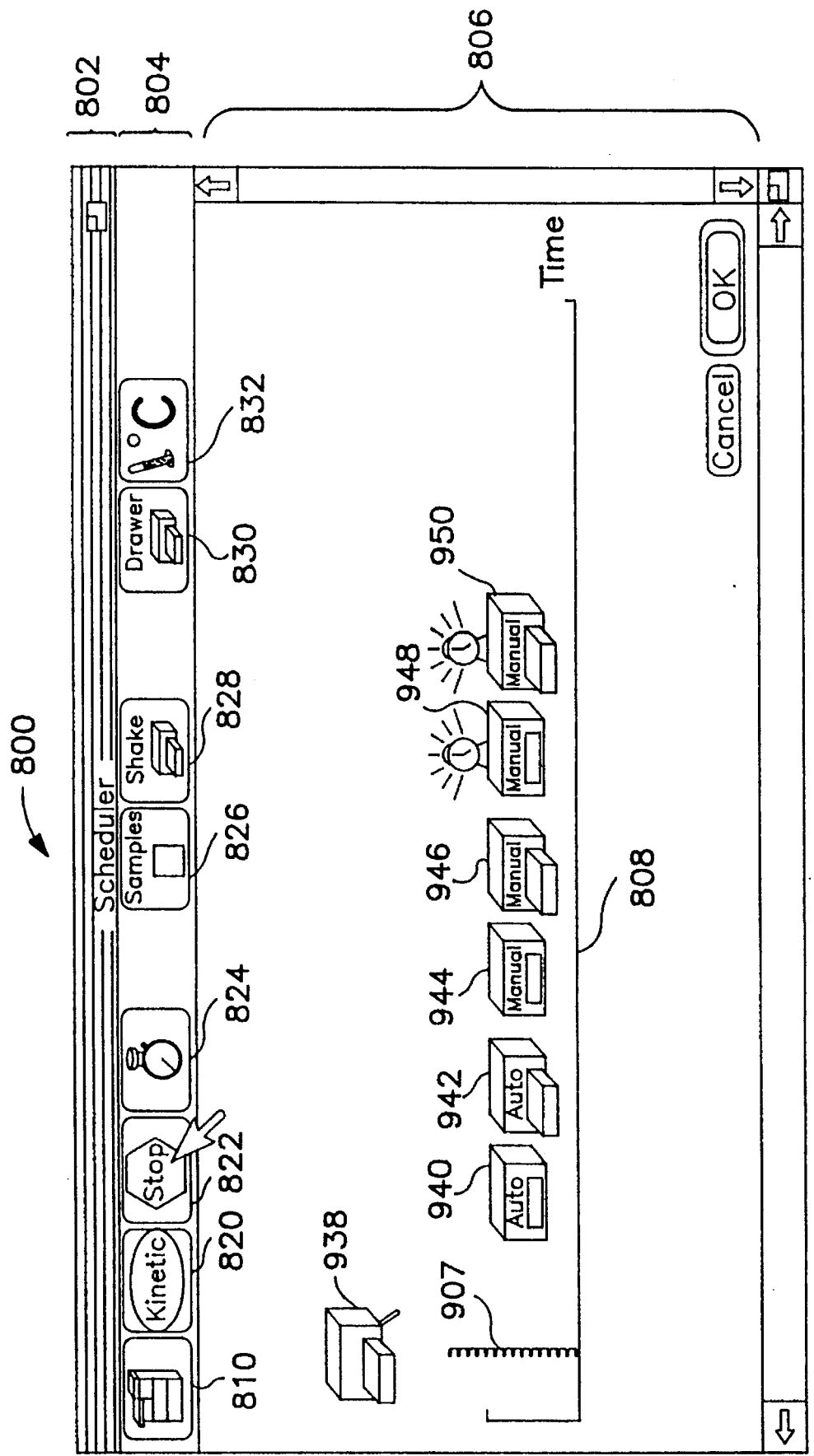
FIG. 9p illustrates a drawer cursor/icon and a plurality of drawer icons according to an embodiment of the invention.

Once an option on drawer menu 936 has been selected, cursor 904 becomes a drawer icon/cursor 938 as shown in FIG. 9p. When a user selects a position on time line 808, a drawer icon is inserted at the location indicated by insertion line 907. Preferably, the drawer icon reflects the drawer operation specified by the drawer icon. For example, the drawer icon may be any of drawer icons 940, 942, 944, 946, 948 and 950 which respectively specify door operations for automatically closing a drawer, automatically opening a drawer, manually closing a drawer, manually opening a drawer, manually closing a drawer and generating an alarm, and manually opening a drawer and generating an alarm.

Figure 12:
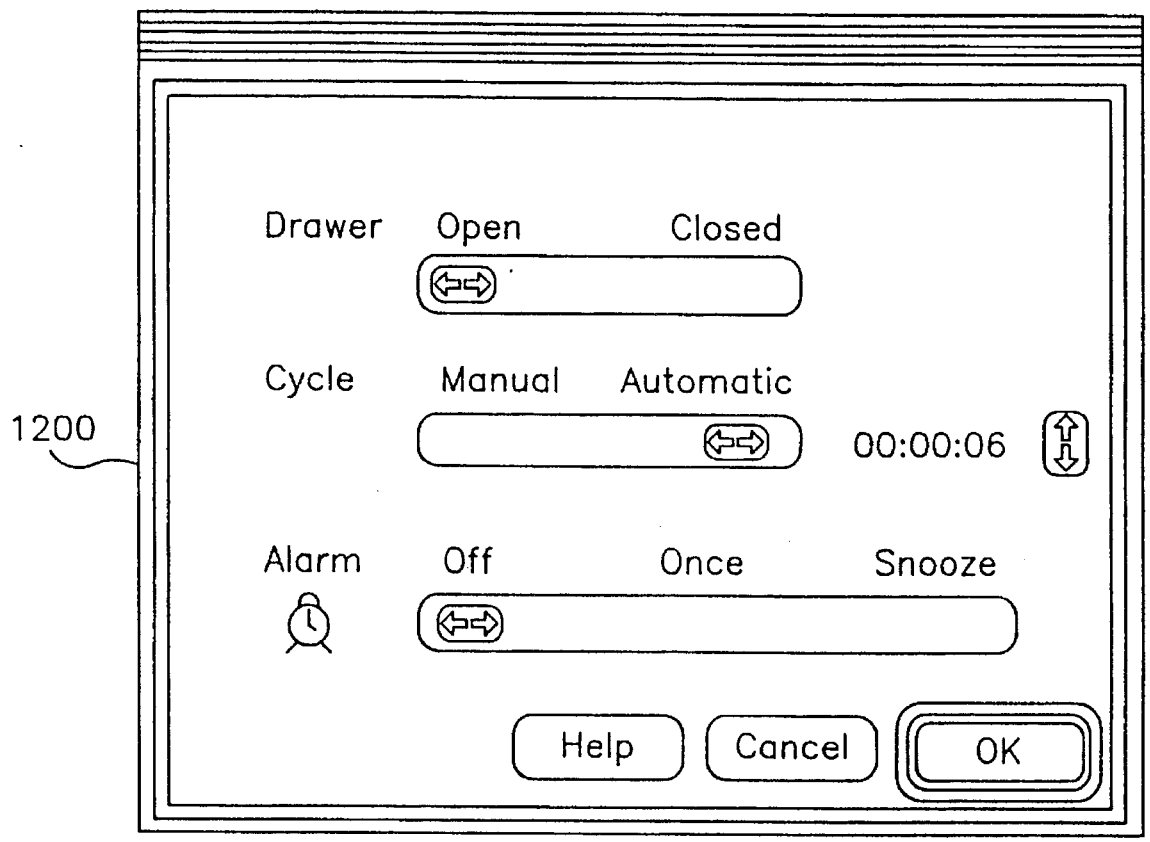
FIG. 12 illustrates a dialog box for specifying a drawer operation according to an embodiment of the invention.

When a user selects a drawer icon on time line 808, a drawer dialog box 1200 appears, as shown in FIG. 12. The drawer dialog box 1200 includes controls which allow a user to specify whether the drawer operation is to open or close the door, whether the operation is manual or automatic, and whether to generate an alarm at the time the drawer operation is to be performed. The alarm option is typically used for manual drawer operations, where the alarm alerts a user when the user must perform a particular manual operation.

Temperature icon 832 may be copied to time line 808 using the same icon insertion procedures as described above. A temperature icon on time line 808 specifies the performance of a temperature probing operation. When a temperature icon on time line 808 is selected, a dialog box is displayed which includes controls for specifying a temperature-related operation. For example, the controls may allow a user to specify that the temperature of the present specimens is to be measured and recorded. The controls may also allow a user to specify a temperature which must be achieved before processing will continue.

The operational icons described above specify operations to be performed by external devices. These operations are performed by the external devices in response to control signals sent by computer 102 to the external devices. A different type of operation icon specifies operations to be performed by computer 102 itself. The stopwatch icon 824 is one such operation icon.

The stopwatch icon 824 may be placed on time line 808 in the same manner as described above with respect to the device icon 810. Specifically, when stopwatch icon 824 is initially selected, a menu 906 is displayed as shown in FIG. 9h. Menu 906 has a plurality of choices corresponding to operations performed by a typical stopwatch, including "Start", "Stop", "Reset/Start" and "Wait". Selection of a choice from menu 906 closes the menu 906 and turns cursor 904 into a stopwatch icon/cursor 917, as shown in FIG. 9i. When a position on the time line 808 is selected, the stopwatch icon/cursor 917 changes back to cursor 904. In addition, a stopwatch icon is inserted onto time line 808 at the selected position. Preferably, stopwatch icons on time line 808 reflect the selected stopwatch function. For example, stopwatch icons 923, 910, 912 and 914 may depict the stopwatch functions "Reset/Start", "Start", "Stop", and "Wait", respectively.

The stopwatch icon causes computer 102 to perform the functions of a stopwatch. The internal clock of computer 102 is used to track and control elapsed experimental time. The computer emulates a stopwatch by starting, stopping, pausing and resetting a counter value as indicated by stopwatch icons on time line 808. The completion of the operation specified by the operation icon preceding the stopwatch icon triggers the performance of the stopwatch function.

Figure 11:
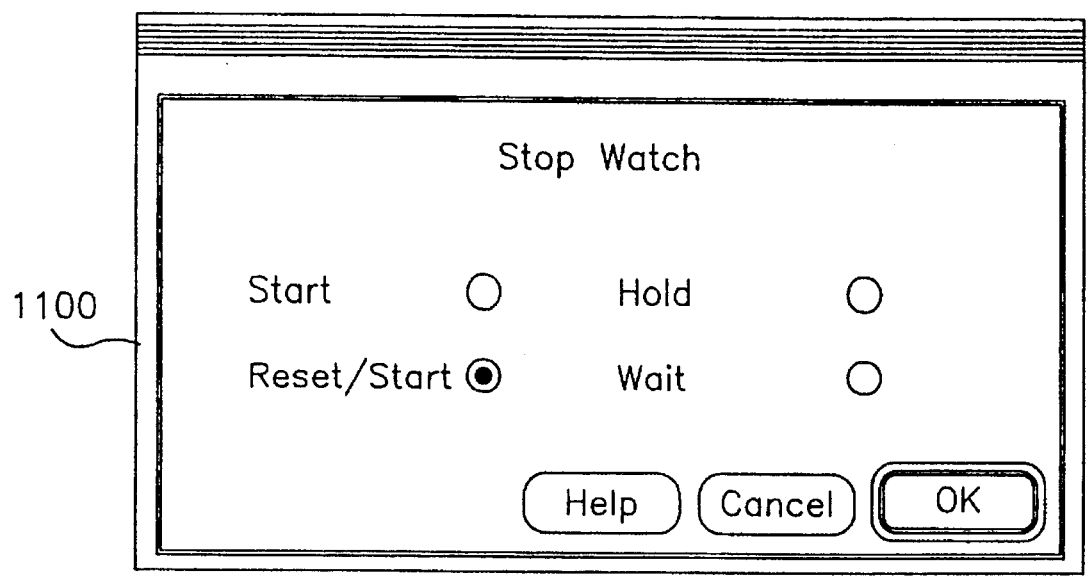
FIG. 11 illustrates a dialog box for specifying a stopwatch operation according to an embodiment of the invention.

Once a stopwatch icon has been placed on time line 808, the stopwatch function associated with the stopwatch icon may be changed by invoking a stopwatch dialog box 1100, as shown in FIG. 11. Stopwatch dialog box 1100 included controls through which a user may designate a stopwatch function. After a stopwatch function is selected, dialog box 1100 will close and the stopwatch icon will reflect the selected stopwatch function.

Preferably, all aspects of an experiment may be specified by operation, instrument and sequence control icons, as described above. However, the use of a textual script language may be desirable under certain circumstances. For example, certain operations may be too complex to easily specify using controls in a dialog box. Also, some experienced script program writers may prefer specifying some operations using textual script commands. Therefore, the dialog box associated with some icons may allow for entry of textual script commands. In addition, a script icon displayed on the icon bar of scheduler windows in addition to operation, instrument and sequence control icons. Copies of the script icon can be placed on time line 808 like any other icon. However, when the script icon is selected, a blank text entry window is displayed. The user may enter text commands into the text window. The operations and/or sequence changes specified by the text commands are executed when the experiment is performed. The timing of the execution of the operations specified in the text commands is dictated by the position of the script icon relative to the other icons on time line 808.

Figure 13:
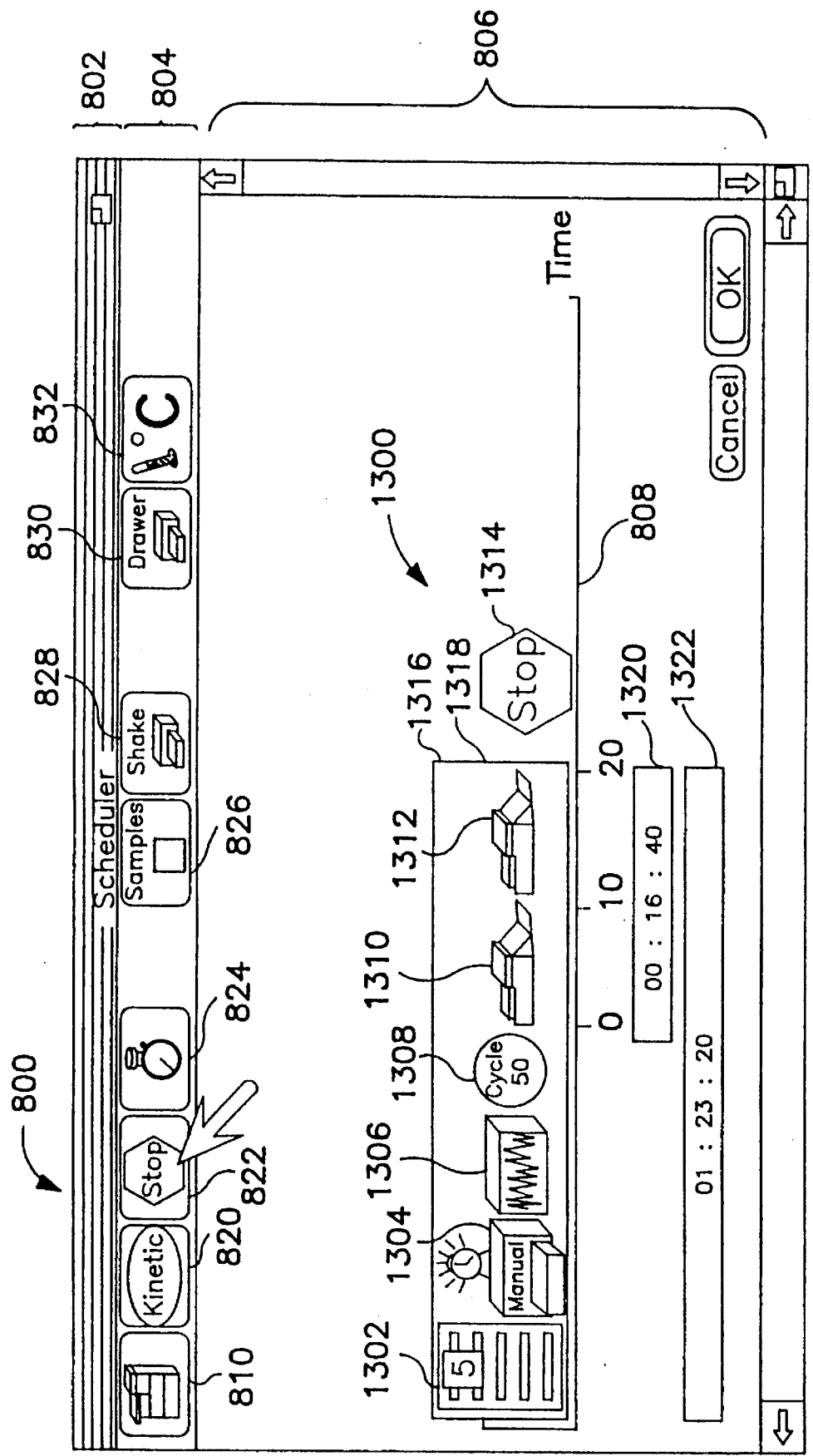
FIG. 13 illustrates a scheduler window with an exemplary icon sequence.

FIG. 13 illustrates an exemplary icon sequence 1300. Icon sequence 1300 includes, from left to right, a stacker icon 1302, a drawer icon 1304, a shake icon 1306, a kinetic icon 1308, a device icon 1310, a second device icon 1312, an a stop icon 1314. A shaded box 1316 extends front stacker icon 1302 and envelops drawer icon 1304, shake icon 1306, kinetic icon 1308, and device icons 1310 and 1312. A shaded box 1318 extends from kinetic icon 1308 and envelops device icons 1310 and 1312.

When a user instructs computer 102 to perform the experiment specified by the icon sequence 1300, computer 102 responds as specified by icon sequence 1300. Specifically, stacker icon 1302 is a sequence control icon. As such it controls the sequence in which other icons are processed, but does not specify an operation itself. The first operation icon in the icon sequence 1300 is drawer icon 1304. Drawer icon 1304 specifies that a drawer is to be opened manually, and that an alarm should be generated. Therefore, computer 102 generates an alarm. The alarm could take many forms, including an audible "beep" and/or a window that indicates what user action is required.

The drawer that is to be opened is the drawer of the instrument specified by the first device icon to the right of drawer icon 1304. In this case, drawer icon 1304 indicated that the drawer of the instrument associated with device icon 1310 is to be opened. Once the user has perforated the required drawer operation, the computer 102 generates a control signal to the instrument specified by device icon 1310 to cause the instrument to shake its samples, as indicated by shake icon 1306.

Similar to stacker icon 1302, kinetic icon 1308 is a sequence control icon and does not specify an operation. As explained above, in the illustrated embodiment, device icons 1310 and 1312 are operation icons as well as device icons in that they specify a data acquisition operation as well as an external device. Therefore, computer 102 next generates control signals to cause the instrument associated with device icon 1310 to gather data, as specified by device icon 1310. Computer 102 will then send control signals to the instrument associated with device icon 1312 to cause the instrument associated with device icon 1312 to gather data.

In a typical experiment, device icons 1310 and 1312 would specify two different instrument settings of the same physical instrument. For example, device icon 1310 may specify a photometer gathering data in one mode, while device icon 1312 specifies the same photometer gathering data in another mode. When the instrument specified by device icons 1310 and 1312 has finished gathering data in both modes, the first cycle specified by kinetic icon 1308 is completed. However, kinetic icon 1308 specifies that fifty such cycles must be performed. Therefore, computer 102 sends control signals to the device specified by device icons 1310 and 1312 to repeat the data acquisition process forty-nine more times.

When the fifty data acquisition cycles specified by kinetic icon 1308 have been completed, then the first stacker cycle specified by stacker icon 1302 is finished. Stacker icon 1302 specifies that five such stacker cycles are to be performed. Therefore, computer 102 sends all of the control signals described above four more times. When the fifth stacker cycle is completed, data acquisition is over, as indicated by stop icon 1314.

Assume that device icons 1310 and 1312 represent the same photometer, but that device icon 1310 represents a setup in which the photometer performs one type of light-measuring operation and device icon 1312 represents a setup in which the photometer performs a second type of operation. The icon sequence 1300 would cause computer 102 to send control signals to cause the photometer to perform the first light-measuring operation on a first sample and the second operation on the first sample. This would be repeated fifty times responsive to the kinetic icon 1308. Then during the second stacker cycle computer 102 would send control signals to cause the photometer to perform the first light-measuring operation on a second sample and the second operation on the second sample. This also would be repeated fifty times responsive to the kinetic icon 1308. This process would continue until the first and second light-measuring operations were performed fifty times on each of five samples.

In the preferred embodiment, time bars, such as time bar 1320 and time bar 1322, are displayed below portions of the icon sequence. Time bars indicate how much time will elapse during the performance of the operations specified by the icons above the time bars. Thus, the performance of the operations specified by kinetic icon 1308, device icon 1310 and device icon 1312 will take sixteen minutes and forty seconds, as shown by time bar 1320. The performance of the operations specified by stacker icon 1302, drawer icon 1304, shake icon 1306, kinetic icon 1308, and device icons 1310 and 1312 will take one hour, twenty-three minutes and twenty seconds, as shown by time bar 1322.

Figure 14:
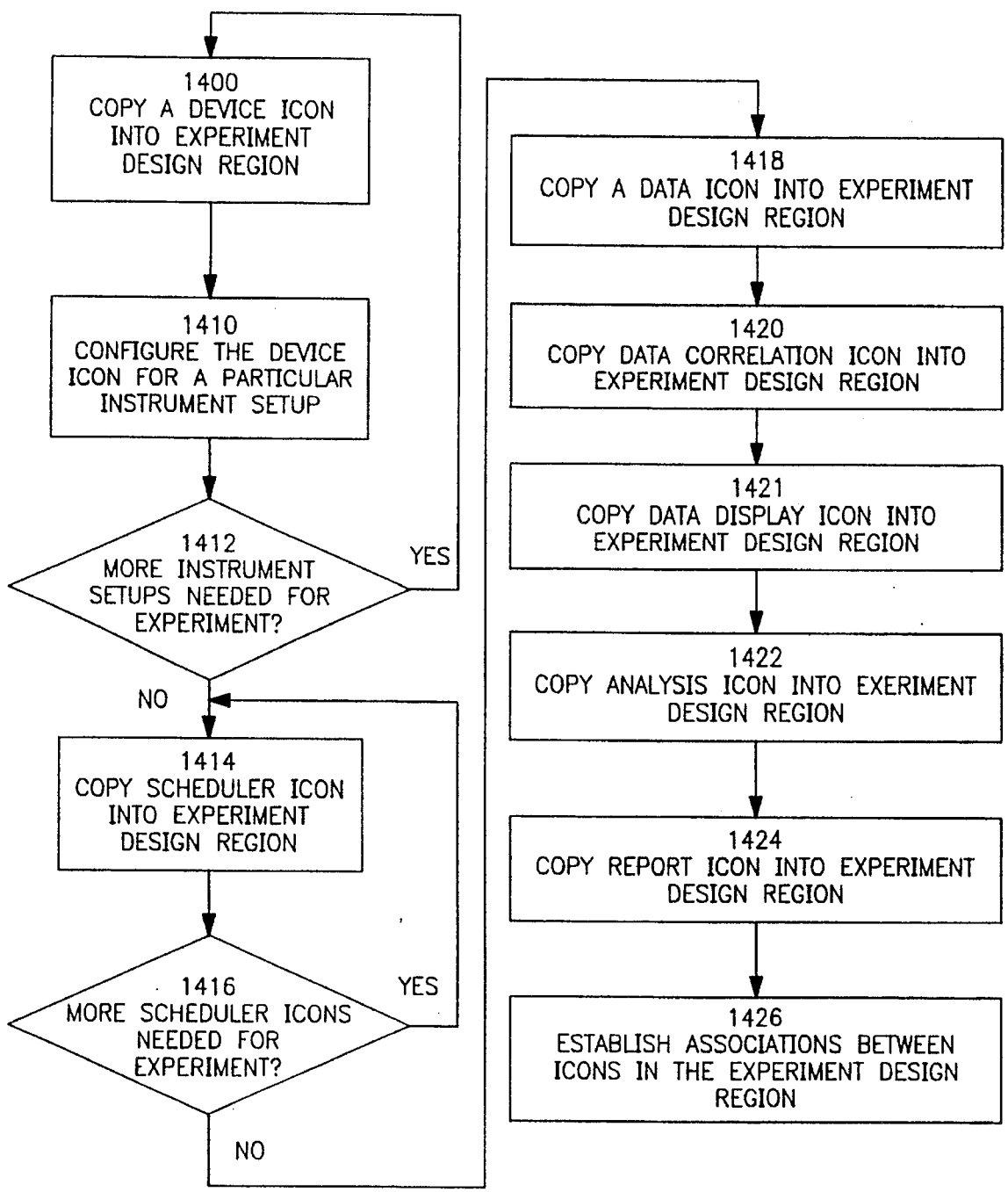
FIG. 14 is a flow chart illustrating the general steps for designing an experiment according to an embodiment of the invention.

FIG. 14 is a flow chart illustrating the general steps for designing an experiment according to an embodiment of the invention. At step 1400, a device icon is copied into the experiment design region. At step 1410, the device icon is configured to specify a particular instrument setup. This step typically involves invoking a window or dialog box associated with the device icon, and setting controls in the window or dialog box to specify a particular instrument and an operational mode for that instrument.

At step 1412, it is determined whether more instrument setups are needed to perform the desired experiment. Preferably, a separate device icon is used for each required configuration of each required device. Thus, if an experiments requires the use of a first device in a first mode and a second mode, and a second device in a third mode and a fourth mode, then four device icons will be employed, one for each instrument setup combination. Steps 1400 and 1410 are repeated until all of the instrument setup combinations required in the experiment are represented by device icons in the experiment design region.

At step 1414, scheduler icon is copied into the experiment design region. As explained above, a scheduler icon represents a series of operations to be performed during the experiment. At step 1416, it is determined whether more scheduler icons needed for experiment. If an experiment requires two separate series of operations, then two scheduler icons should be placed onto the experiment design region. It may be desirable to break complex experiments down into separable series of operations to simplify the icon sequence associated with each scheduler.

Steps 1418 through 1434 are optional in that their applicability depends on the nature of the experiment to be performed. At step 1418, a database icon is copied into the experiment design region. Database icons specify where and in what format data generated during an experiment will be stored. Experiments which do not generate data will therefore not require database icons.

At step 1420, a data correlation icon is copied into the experiment design region. The data correlation icon establishes a correlation between labels and data measurement locations (e.g. cells in a plate).

At step 1421, a data view icon is copied into the experiment design region. The data view icon may be invoked to display the data acquired during the experiment. The data may be displayed in various formats. A user may also specify operations for generating derived data, which may also be displayed.

At step 1422, an analysis icon is copied into the experiment design region. The analysis icon specifies calculations to be performed and graphs to be generated based on data associated with certain labels.

At step 1424, a report icon is copied into the experiment design region. The report icon specifies the format and contents of a report generated based on data acquired during the performance of the experiment.

In steps 1426, a user establishes associations between the various icons that have been copied into the experiment design region. For example, the device icons copied at step 1400 may be associated with scheduler icons. The scheduler icons copied at step 1416 may be associated with database icons. The data correlation icons copied at step 1420 may be associated with database icons. The data view icons copied at step 1421 may be associated with the database icons. The analysis icons copied at step 1422 may be associated with data view icons. The report icons copied at step 1424 may be associated with database icons, data view icons and/or analysis icons.

It should be noted that there is no particular order to the steps shown in FIG. 14. For example, a database icon and a report icon may be copied to an experiment design region and associated with each other before any device icons have been copied into the experiment design region.

Figure 15:
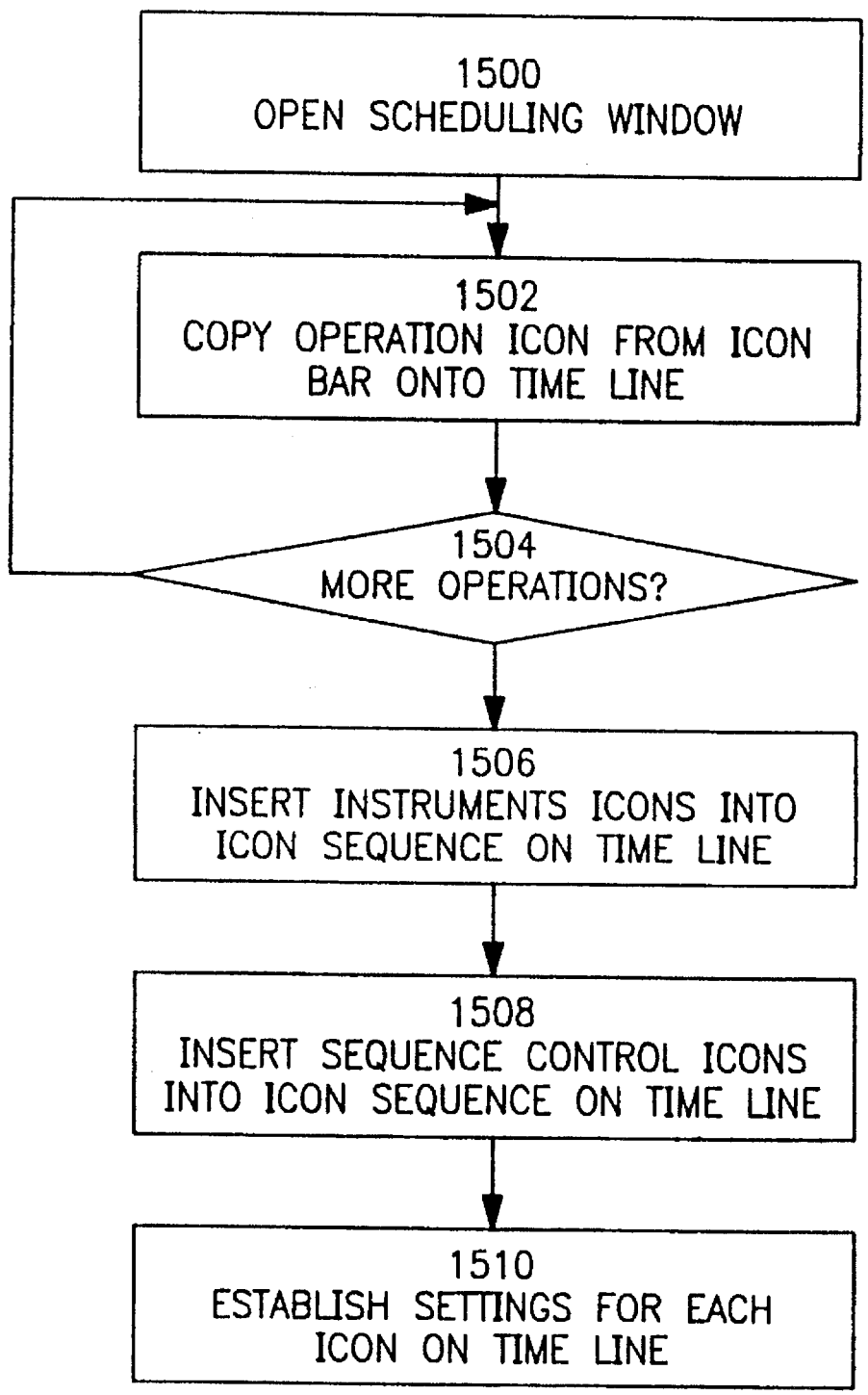
FIG. 15 is a flow chart illustrating the general steps for construction an icon sequence to specify a series of operations.

Once an overview of the experiment has been designed as described with reference to FIG. 14, the specific operations to be performed in the experiment must be specified. This is accomplished by establishing a sequence of icons in scheduler windows. FIG. 15 is a flow chart illustrating the general steps for construction an icon sequence to specify a series of operations.

At step 1500, a scheduler window is opened. Preferably each scheduler icon in the experiment design region has its own scheduler window. The scheduler window associated with an icon appears when the scheduling icon is invoked. A scheduler icon may be invoked, for example, by double-clicking on the scheduler icon.

At step 1502, an operation icon is copied from icon bar onto time line. The operation icon represents an operation that must be performed in the experiment. The operation icon is inserted into the icon sequence at a position dependent on when the operation is to be performed relative to other operations.

At step 1504, it is determined whether there are more operations which must be specified. Specifically, each operation that will be required in the experiment (or in the portion of the experiment associated with the current scheduler icon) must be specified by an operation icon.

At step 1506, device icons are inserted into the icon sequence on time line. The device icons must be inserted at locations which indicate which operations will be performed by the devices that the device icons specify. For example, in one embodiment, the first device icon to the right of any given operation icon must specify the device which will perform the operation specified by the given operation icon.

At step 1508, sequence control icons are inserted into the icon sequence on time line. The sequence control icons are inserted at positions according to which icons in the icon sequence will be affected by them.

At step 1510, settings for each icon in the icon sequence on the time line are established. The specific process for establishing settings may vary depending on the type of icon involved. Preferably, invoking an icon will cause a dialog box to appear that contains controls through which settings relating to the icon may be established. However, some settings may be established through menus which appear at the time an icon is selected from the icon bar.

For each sequence control icon, a user must establish which icons will be affected by the sequence control icon. These settings may be established by adjusting the boundaries of a box extending from the sequence control icon so that it envelops those icons whose sequence the sequence control icon is meant to affect.

The steps shown in FIG. 15 may be performed in any order. For example, the settings for some icons are established before they are inserted into the icon sequence, while the settings for other icons are established after they have been inserted. In addition, device icons may be inserted into the sequence before or after their associated operation icons.

After setting up the overall scheme of an experiment in the experiment design region and the specific sequence of operations in one or more scheduler windows, a user may invoke computer 102 to automatically perform the experiment. In response, computer 102 transmits control signals to cause the external devices specified in the icon sequence to perform the operations specified in the icon sequence in the sequence specified in the icon sequence.

Computer 102 also causes the data acquired during the performance of the operations to be stored as specified by any database icons. Computer 102 causes the data generated during different operations to be associated with the labels specified by any data correlation icons. Computer 102 performs calculations and generates displays as specified by any data view icons. Computer 102 performs calculations and generates displays based on the values associated with particular labels as specified by any analysis icons. Finally, computer 102 generates a report as specified by any report icons.

A user may cause computer 102 to save data representing the icon setup used to perform the experiment. A user may then reload the icon setup at a later date to duplicate the experiment, or to modify for a similar experiment. A user may also send the experiment setup data to others to use as a template for their experiments. The stored icon setup also serves as a record of the operations performed during the experiment. Consequently, all experiments performed in this manner are traceable, easily repeatable, and the reported experiment results are easily verified.

It should be noted that, while the invention has been described in the context of automating an experiment, it is in no way limited to that context. Control of external devices by a computer may be automated, regardless of whether the operations performed by the external devices constitute an experiment, by establishing a sequence of icons according to an embodiment of the invention. For example, robotic mechanisms on an assembly line may be represented by device icons. The operations that the robotic mechanisms are able to perform may be represented by operation icons. A user may construct an icon sequence to automate an entire assembly line.

The present invention may be used to automate both sequence-sensitive and sequence-independent processes. Sequence-sensitive processes include, for example, assembly line operations where the desired result dictates a particular order of operations. For example, tires cannot be installed on a car until the axle upon which the tire will be placed has already been installed. In contrast, many experiments are sequence independent. For example, in an experiment that calls for two light-measuring operations, the results will typically be the same regardless of the order in which the light-measuring operations are performed.

At each stage in the automation process, a user is confronted by only a small amount of information. For example, in selecting icons for the icon sequence in a scheduler window, a user simply needs to think about which operations which operations must be performed, and when, relative to other operations, they must be performed. The user need not worry about the specifics of each of the operations. Once the sequence of icons is established, the user can then select an operation icon to invoke a dialog box that allows the user to set the specifics of the operation. The controls in the dialog box prompt the user for the required information. The details relating to each icon are entered separately, so the user can concentrate on one operation or instrument setup at a time. Because at each level of the automation process the user is confronted with only the information needed at that level, automating operations through the disclosed method requires much less time and expertise than is required in textual programming environments.

While specific embodiments of the present invention have been described, various modifications and substitutions will become apparent to one skilled in the art by this disclosure. Such modifications and substitutions are within the scope of the present invention, and are intended to be covered by the following claims.

What is claimed is:

1. A method for causing a computer to operate an external device, said computer having a display device, the method comprising the steps of:

causing said computer to display on said display device a device icon, said device icon representing said external device;

causing said computer to display on said display device an operation icon, said operation icon representing an operation performable by said external device;

constructing an icon sequence, said icon sequence including said device icon and said operation icon; and causing said computer to generate control signals responsive to said icon sequence, said control signals including a control signal for causing said external device to perform said operation;

wherein said external device is a first external device of a plurality of external devices and said device icon is a first device icon of a plurality of device icons, each device icon of said plurality of device icons representing a corresponding external device of said plurality of external devices, wherein said step of constructing said icon sequence includes inserting said plurality of device icons into said icon sequence;

and wherein said step of constructing said icon sequence includes inserting a plurality of operation icons into said icon sequence, wherein said plurality of operation icons represent a plurality of operations, wherein said step of causing said computer to generate control signals includes causing said computer to generate control signals to cause said plurality of operations to be performed by said plurality of external devices, wherein the one or more devices of said plurality of external devices which performs a given operation of said plurality of operations is determined based upon a plurality of relative positions of said plurality of device icons and said plurality of operation icons in said icon sequence.

2. The method of claim 1 further comprising the step of causing said device icon to represent said external device by performing the steps of:

specifying a specific device type for said device icon, wherein said specific device type is the device type of said external device;

causing said computer to display on said display device a plurality of indications of external devices of said specific device type, said plurality of indications including an indication of said external device; and selecting said indication of said external device from said plurality of indications.

3. The method of claim 1 further comprising the step of causing said computer to display on said display device a sequence control icon, said step of constructing said icon sequence including the step of inserting said sequence control icon into said icon sequence, said step of causing said computer to generate control signals including the step of causing said computer to generate control signals in a sequence responsive to said sequence control icon.

4. The method of claim 3 further including the steps of:

specifying a plurality of target icons in said icon sequence, said plurality of target icons including at least one operation icon, and specifying a number of repetitions associated with said sequence control icon;

said step of causing said computer to generate control signals including the step of causing said computer to generate control signals cause an external device associated with said at least one operation icon to perform the operation represented by said at least one operation icon for said number of repetitions.

5. The method of claim 3 further including the steps of:

causing said computer to display on said display device one or more controls associated with said sequence control icon, wherein said one or more controls are controls for specifying a terminating condition; and specifying said terminating condition using said one or more controls.

6. The method of claim 5 wherein said step of specifying said terminating condition includes specifying a number of iterations of said operation.

7. The method of claim 1 further comprising the steps of:

causing said computer to display on said display device an experiment design region;

causing said computer to display on said display device a scheduler icon;

copying said device icon into said experiment design region;

copying said scheduler icon into said experiment design region;

associating said device icon with said scheduler icon; and causing said computer to display on said display device a scheduler window associated with said scheduler icon;

wherein said step of constructing said icon sequence includes constructing said icon sequence in said scheduler window.

8. The method of claim 7 further including the step of causing said computer to display on said display device an association indication that visually depicts an association between said device icon and said scheduler icon.

9. The method of claim 1 wherein said device icon and said operation icon are a single composite icon representing both said external device and said operation performable by said external device.

10. The method of claim 1 further including the steps of:

causing said computer to display on said display device one or more controls associated with said device icon, wherein said one or more controls are controls for specifying operational parameters for said external device; and specifying operational parameters for said external device using said one or more controls.

11. The method of claim 10 wherein said external device has a plurality of operational modes, wherein said step of specifying operational parameters includes selecting a mode of said plurality of operational modes.

12. The method of claim 1 further including the steps of:
   causing said computer to display on said display device one or more controls associated with said operation icon, wherein said one or more controls are controls for specifying operational parameters for said operation; and
   specifying operational parameters for said operation using said one or more controls.

13. The method of claim 12 wherein said step of specifying operational parameters for said operation includes specifying a duration of said operation.

14. The method of claim 1 wherein said external device is a photometer.

15. A method for causing a computer to operate an external device, said computer having a display device, wherein said external device generates data responsive to performing an operation, the method comprising the steps of:
   causing said computer to display on said display device a device icon, said device icon representing said external device;
   causing said computer to display on said display device an operation icon, said operation icon representing an operation performable by said external device;
   constructing an icon sequence, said icon sequence including said device icon and said operation icon:
   causing said computer to generate control signals responsive to said icon sequence, said control signals including a control signal for causing said external device to perform said operation;
   causing said computer to display on said display device an experiment design region;
   causing said computer to display on said display device a scheduler icon;
   copying said device icon into said experiment design region:
   copying said scheduler icon into said experiment design region;
   associating said device icon with said scheduler icon;
   causing said computer to display on said display device a scheduler window associated with said scheduler icon;
   wherein said step of constructing said icon sequence includes constructing said icon sequence in said scheduler window:
   causing said computer to display on said display device a database icon;
   copying said database icon into said experiment design region;
   specifying a database format associated with said database icon;
   associating said scheduler icon with said database icon; and
   storing said data generated during said operation in said database format.

16. The method of claim 15 further comprising the steps of:
   causing said computer to display on said display device a report icon;
   copying said report icon into said experiment design region;
   specifying a particular report format associated with said report icon;
   associating said database icon with said report icon; and
   generating a report of said data in said particular report format.

17. A method for causing a computer to operate an external device, said computer having a display device, wherein said external device generates a first set of data responsive to performing an operation, the method comprising the steps of:
   causing said computer to display on said display device a device icon, said device icon representing said external device;
   causing said computer to display on said display device an operation icon, said operation icon representing an operation performable by said external device;
   constructing an icon sequence, said icon sequence including said device icon and said operation icon;
   causing said computer to generate control signals responsive icon sequence, said control signals including a control signal for causing said external device to perform said operation;
   causing said computer to display on said display device an experiment design region;
   causing said computer to display on said display device as scheduler icon;
   copying said device icon into said experiment design region;
   copying said scheduler icon into said experiment design region;
   associating said device icon with said scheduler icon;
   causing said computer to display on said display device a scheduler window associated with said scheduler icon;
   wherein said step of constructing said sequence includes constructing said icon sequence in said scheduler window;
   causing said computer to display on said display device a data correlation icon;
   copying said data correlation icon into said experiment design region;
   specifying a correlation between said first set of data and a first plurality of labels with controls associated with said data correlation icon;
   associating said scheduler icon with said data correlation icon; and
   causing said computer to generate correlation data representing said correlation responsive to said data correlation icon.

18. A method for causing a computer to operate an external device, said computer having a display device, the method comprising the steps of:
   causing said computer to display on said display device a device icon, said device icon representing said external device;
   causing said computer to display on said display device an operation icon, said operation icon representing an operation performable by said external device;
   constructing an icon sequence, said icon sequence including said device icon and said operation icon;
   causing said computer to generate control signals responsive to said icon sequence, said control signals including a control signal for causing said external device to perform said operation;
   causing said computer to display on said display device a stopwatch icon, said icon sequence including said stopwatch icon; and causing said computer to begin tracking elapsed time upon completion of an operation represented by an icon directly preceding said stopwatch icon in said icon sequence.

19. A method for causing a computer to operate an external device, the computer having a display device, the method comprising the steps of:

causing said computer to display on said display device an operation icon, said operation icon representing an operation performable by said external device;

causing said computer to display on said display device a sequence control icon, said sequence control icon being associated with a terminating condition;

constructing an icon sequence including said sequence control icon and said operation icon; and causing said computer to generate control signals to said external device, said control signals causing said external device to repeatedly perform said operation until said terminating condition is satisfied wherein a linear insertion position of said sequence control icon determines which icons in the icon sequence are affected by said sequence control icon.

20. The method of claim 19 further comprising the steps of:

causing said computer to display controls associated with said sequence control icon, wherein said controls are controls for specifying said terminating condition; and specifying said terminating condition with said controls.

21. The method of claim 19 further comprising the steps of causing said computer to display controls associated with said operation icon, wherein said controls are controls for specifying operational parameters of said operation; and specifying said operational parameters with said controls.

22. A method for graphically programming a computer to automate an analysis, said computer having a display device, the method comprising the steps of: · constructing a sequence of icons on said display device, said sequence of icons including at least one icon specifying an operation and at least one icon specifying an external device; and causing said computer to generate control signals to said at least one external device, said control signals causing said at least one external device to perform said operation wherein said step of constructing said sequence of icons includes the step of inserting into said sequence of icons a plurality of operation icons, each operation icon of said plurality of operation icons specifying an operation of a plurality of operations, wherein said step of causing said computer to generate control signals includes causing said computer to generate control signals to cause said plurality of operations to be performed in a sequence corresponding to a plurality of relative positions of said plurality of operation icons in said sequence of icons.

23. The method of claim 22 wherein said step of constructing said sequence of icons includes the step of inserting into said sequence of icons at least one sequence control icon, said computer generating said control signals to cause said sequence in which said plurality of operations are performed to be modified responsive to said at least one sequence control icon.

24. A system for automatically performing a series of operations, comprising:

a computer having a display device and an input device;

at least one external device operatively coupled to said computer;

said computer executing a series of instructions to cause said at least one external device to perform said series of operations, said series of instructions including instructions for:

constructing and displaying a sequence of icons on said display device responsive to input from said input device, said sequence of icons including at least one operation icon, said at least one operation icon specifying said series of operations; and generating control signals to said at least one external device, said control signals causing said at least one external device to perform said series of operations;

wherein said series of instructions includes instructions for:

inserting into said sequence of icons a plurality of operation icons responsive to input from said input device, each operation icon of said plurality of operation icons specifying an operation; and causing said computer to generate control signals to cause said series of independent operations to be performed in a sequence corresponding to a plurality of relative positions of said plurality of operation icons in said sequence of icons.

* * * * *